(12) United States Patent
Rehder et al.

(10) Patent No.: US 12,737,806 B1
(45) Date of Patent: Sep. 15, 2026

(54) METHODS AND APPARATUSES FOR CUSTOMIZED CREDIT CARD RECOMMENDATIONS

(71) Applicant: ConsumerInfo.com, Inc., Costa Mesa, CA (US)

(72) Inventors: Erik John Rehder, Los Angeles, CA (US); Elias John Tuma, Orange, CA (US); Andrew Alexander Charles Scott, Irvine, CA (US); Rakesh Patel, Anaheim Hills, CA (US); Christine Marie Brueggeman, Irvine, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 63 days.

(21) Appl. No.: 19/002,454

(22) Filed: Dec. 26, 2024

Related U.S. Application Data

(63) Continuation of application No. 18/152,613, filed on Jan. 10, 2023, now Pat. No. 12,182,859, which is a continuation of application No. 17/656,604, filed on Mar. 25, 2022, now Pat. No. 11,580,598, which is a continuation of application No. 16/685,481, filed on Nov. 15, 2019, now Pat. No. 11,315,179.

(60) Provisional application No. 62/768,833, filed on Nov. 16, 2018.

(51) Int. Cl.
*G06Q 40/03* (2023.01)
*G06N 3/08* (2023.01)
*G06Q 30/0226* (2023.01)

(52) U.S. Cl.
CPC .............. *G06Q 40/03* (2023.01); *G06N 3/08* (2013.01); *G06Q 30/0226* (2013.01)

(58) Field of Classification Search
CPC ..... G06Q 40/025; G06Q 30/0226; G06N 3/08
See application file for complete search history.

*Primary Examiner* — Lindsay M Maguire
(74) *Attorney, Agent, or Firm* — Knobbe, Martens, Olson & Bear, LLP

(57) ABSTRACT

A credit card recommendation system for recommending credit cards to a user can be based on the consumer's estimated monthly spend, estimated spend across a plurality of categories, and user credit data. The credit card recommendation system can filter credit cards based on a likelihood of approval for the user. The credit card recommendation can determine a reward valuation and an adjustment valuation by assessing user spend and the characteristics corresponding to the credit card. The credit card recommendation can train a model to score credit cards for users, and apply specific user data to the model to determine a credit card score particular to the user.

19 Claims, 13 Drawing Sheets

Figure 3:
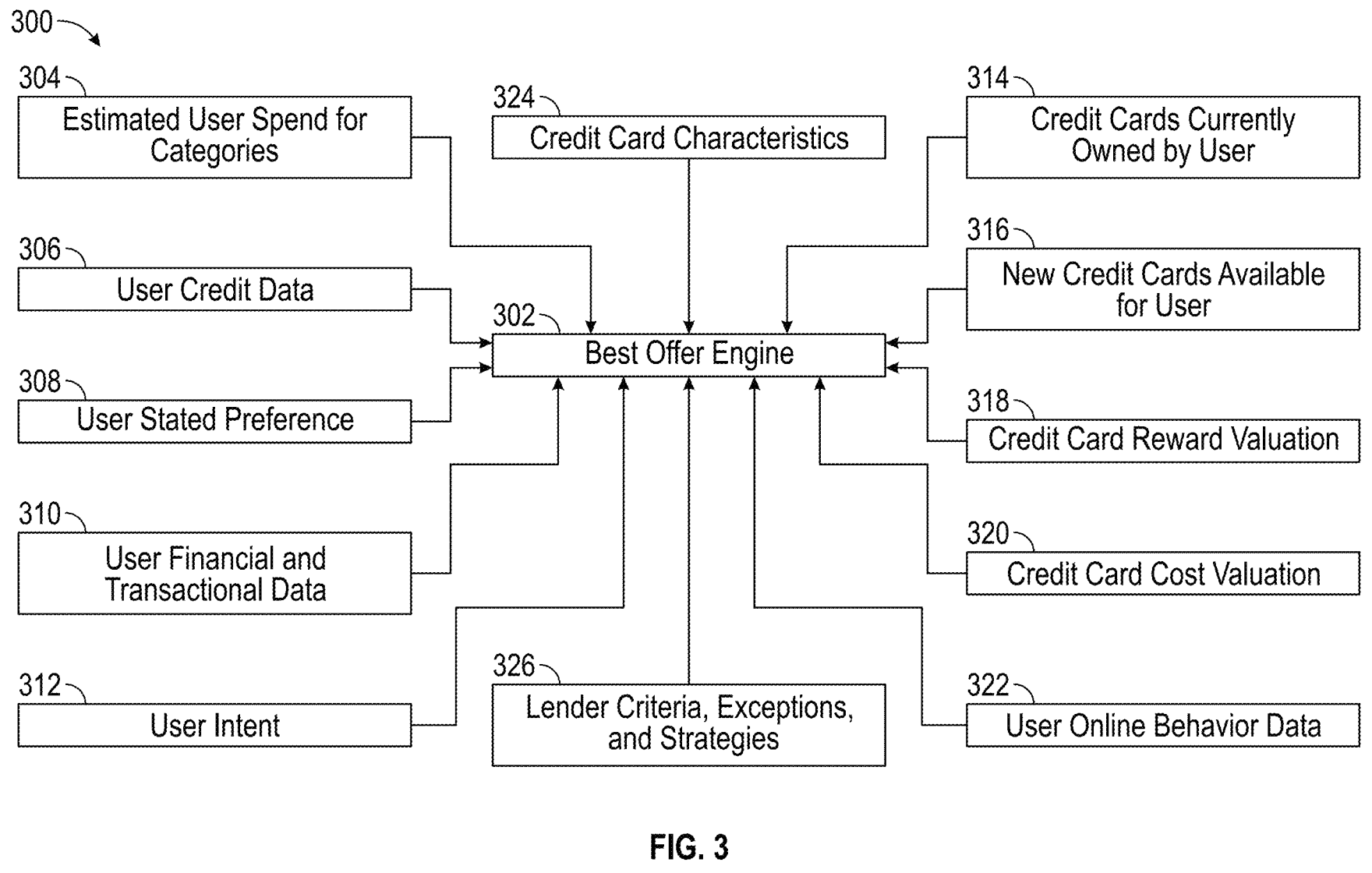

300

304 Estimated User Spend for Categories

306 User Credit Data

308 User Stated Preference

310 User Financial and Transactional Data

312 User Intent

324 Credit Card Characteristics

302 Best Offer Engine

326 Lender Criteria, Exceptions, and Strategies

314 Credit Cards Currently Owned by User

316 New Credit Cards Available for User

318 Credit Card Reward Valuation

320 Credit Card Cost Valuation

322 User Online Behavior Data

| | | | | Credit Score | | | | | | |
|---|---|---|---|---|---|---|---|---|---|---|
| Vendor | Vendor Code | Offer | Offer Code | 450-500 | 500-550 | 550-600 | 600-650 | 650-700 | 700-750 | 750-800 |
| Bank 1 | ABC123 | Credit Card A | A555444 | | | 13.44% | 14.44% | 10.21% | | |
| | | Credit Card B | A555666 | | | | | | | |
| | | Credit Card C | A555777 | | | | | | | |
| | | Credit Card D | A555888 | | | | | 4.40% | | |
| | | Credit Card E | A555999 | 2% | 1.33% | 1.16% | 1.99% | | | |
| | | Credit Card F | A555000 | | | | | | | |
| Bank 2 | DEF456 | Credit Card G | A555444 | | | | 20.55% | 27.00% | 21.11% | |
| | | Credit Card H | A555333 | | | | | | | |
| | | Credit Card I | A555222 | | | | | | | |

Within the Range

Not Within the Range

Excluded

FIG. 4

METHODS AND APPARATUSES FOR CUSTOMIZED CREDIT CARD RECOMMENDATIONS

CROSS-REFERENCE TO RELATED APPLICATIONS

This application is a continuation application of U.S. patent application Ser. No. 18/152,613 filed Jan. 10, 2023, which is a continuation application of U.S. patent application Ser. No. 17/656,604 filed Mar. 25, 2022, which is a continuation application of U.S. patent application Ser. No. 16/685,481 filed Nov. 15, 2019, which claims the benefit of priority under 35 U.S.C. § 119(e) to U.S. Provisional App. No. 62/768,833, filed Nov. 16, 2018, each of which is hereby incorporated by reference in its entirety herein.

BACKGROUND

Individuals can navigate to a lender's website and can view various credit card offers. The consumer can view characteristics of credit card offers, such as points awarded for credit card use. For example, a credit card can provide a 2× multiplier for groceries and 5× multiplier for travel. The consumer can apply for the credit card directly on the credit card company's website by selecting the credit card of choice, and providing his or her personal and financial information in an online form. The consumer can receive an indication on whether they were approved or denied for the credit card, such as via email.

SUMMARY

The systems, methods, and devices of this disclosure each have several innovative embodiments, no single one of which is solely responsible for the all of the desirable attributes disclosed herein.

Some embodiments may comprise a computing system with one or more hardware computer processors and one or more storage devices. The storage devices may be configured to store software instructions configured to cause one or more hardware computer processors to perform a number of operations. The system for training and using a model to select a subset of content for display, the system may comprise: one or more processors configured to: train a model to determine a score for a credit card when provided with input associated with an individual, wherein the model is trained based at least in part on historical credit data of a plurality of individuals, training data for reward valuation, training data for adjustment valuation, and data indicating likelihood of approval for the credit card; receive user credit data, for a first user, from a credit database; receive, from a user computing device, (a) an estimated spend by the first user for each of a plurality of categories and (b) a reward type preference of the first user; identify a plurality of available credit cards, wherein each of the plurality of credit cards is associated with at least one reward type; determine a reward valuation for each of the plurality of credit cards based on the estimated spend for the plurality of categories, wherein determining the reward valuation for each individual credit card of the plurality of credit cards comprises: receiving multipliers for each of the plurality of categories, wherein the multipliers are specific to the individual credit card; generating category point totals for each of the plurality of categories, wherein the category point totals for an individual category are based on a multiplier corresponding to the individual category and an estimated spend corresponding to the individual category for the first user; and aggregating the category point totals to generate an estimated reward total for the individual credit card with respect to the first user; determine a first adjustment valuation for each of the plurality of credit cards based on the user credit data and an estimated monthly total spend across the plurality of categories, wherein the user credit data comprises a credit score and an existing balance on an existing credit card, wherein the first adjustment valuation is determined at least in part by estimating at least one of an amount of interest or likelihood of interest to be accrued on a newly acquired credit card for the first user based on the credit data of the first user; generate an overall score for each credit card of the plurality of credit cards with respect to the first user, wherein the overall score is generated by providing the trained model with input data associated with the first user, wherein the input data provided to the trained model for an individual credit card is based on at least the user credit data, the reward type preference of the first user, the reward valuation for the individual credit card, and the first adjustment valuation for the individual credit card; rank the plurality of credit cards based at least in part on the overall scores; and identify at least a subset of the credit cards based on the rank for display on the user computing device.

In some embodiments, the first adjustment valuation is further based on an annual percent rate (APR) interest specific to each credit card of the plurality of credit cards.

In some embodiments, to identify the plurality of available credit cards is based on filtering a set of credit cards based on historical approval rates.

In some embodiments, to identify the plurality of available credit cards is further based on the credit score of the first user.

In some embodiments, filtering the set of credit cards is further based on an exclusion rule specific to a third party entity associated with the corresponding credit card.

In some embodiments, to identify the plurality of available credit cards is based on identifying credit cards not currently owned by the first user.

In some embodiments, the one or more processors are further configured to score credit cards currently owned by the first user.

In some embodiments, the model is further trained based on historical transactional data, wherein receiving the score for each of the plurality of credit cards is further based on applying user transactional data to the model.

In some embodiments, the one or more processors are further configured to identify an actual spend for each of the plurality of categories, and determine a second adjustment valuation based on the actual monthly total spend across the plurality of categories.

In some embodiments, the model comprises at least one of: a scorecard or a machine learning algorithm.

Some embodiments include computer-implemented method, the method can comprise: receiving user credit data, for a first user, from a credit database; receiving, from a user computing device, (a) an estimated spend by the first user for each of a plurality of categories and (b) a reward type preference of the first user; identifying a plurality of available credit cards, wherein each of the plurality of credit cards is associated with at least one reward type; determining a reward valuation for each of the plurality of credit cards based on the estimated spend for the plurality of categories, wherein determining the reward valuation for each individual credit card of the plurality of credit cards comprises: receiving multipliers for each of the plurality of categories, wherein the multipliers are specific to the individual credit card; generating category point totals for each of the plurality of categories, wherein the category point totals for an individual category are based on a multiplier corresponding to the individual category and an estimated spend corresponding to the individual category for the first user; and aggregating the category point totals to generate an estimated reward total for the individual credit card with respect to the first user; determining a first adjustment valuation for each of the plurality of credit cards based on the user credit data and an estimated monthly total spend across the plurality of categories; generating an overall score for each credit card of the plurality of credit cards with respect to the first user, wherein the overall score is generated by providing the trained model with input data associated with the first user, wherein the input data provided to the trained model for an individual credit card is based on at least the user credit data, the reward type reference of the first user, the reward valuation for the individual credit card, and the first adjustment valuation for the individual credit card; ranking the plurality of credit cards based at least in part on the overall scores; and identifying at least a subset of the credit cards based on the rank for display on the user computing device.

In some embodiments, the method further comprises: identifying credit cards among the subset of credit cards that were previously displayed to the first user for redisplay of the credit card offer.

In some embodiments, the first adjustment valuation is further based on an annual percent rate (APR) interest specific to each credit card of the plurality of credit cards.

In some embodiments, to identify the plurality of available credit cards is based on filtering a set of credit cards based on historical approval rates.

In some embodiments, the method further comprises identifying an actual spend for each of the plurality of categories, and determining a second adjustment valuation is based on the actual monthly total spend across the plurality of categories.

In some embodiments, the model comprises at least one of: a scorecard or a machine learning algorithm.

Some embodiments include a non-transitory computer storage medium storing computer-executable instructions that, when executed by a processor, can cause the processor to perform operations comprising: receiving user credit data, for a first user, from a credit database; receiving, from a user computing device, (a) an estimated spend by the first user for each of a plurality of categories and (b) a reward type preference of the first user; identifying a plurality of available credit cards, wherein each of the plurality of credit cards is associated with at least one reward type; determining a reward valuation for each of the plurality of credit cards based on the estimated spend for the plurality of categories, wherein determining the reward valuation for each individual credit card of the plurality of credit cards comprises: receiving multipliers for each of the plurality of categories, wherein the multipliers are specific to the individual credit card; generating category point totals for each of the plurality of categories, wherein the category point totals for an individual category are based on a multiplier corresponding to the individual category and an estimated spend corresponding to the individual category for the first user; and aggregating the category point totals to generate an estimated reward total for the individual credit card with respect to the first user; determining a first adjustment valuation for each of the plurality of credit cards based on the user credit data and an estimated monthly total spend across the plurality of categories; generating an overall for each credit card of the plurality of credit cards with respect to the first user, wherein the overall score is generated by providing the trained model with input data associated with the first user, wherein the input data provided to the trained model for an individual credit card is based on at least the user credit data, the reward type reference of the first user, the reward valuation for the individual credit card, and the first adjustment valuation for the individual credit card; ranking the plurality of credit cards based at least in part on the overall scores; and identifying at least a subset of the credit cards based on the rank for display on the user computing device.

In some embodiments, the operations further comprise: identifying credit cards among the subset of credit cards that were previously displayed to the user for redisplay of the credit card offer.

In some embodiments, the first adjustment valuation is further based on an annual percent rate (APR) interest specific to each credit card of the plurality of credit cards.

In some embodiments, to identify the plurality of available credit cards is based on filtering a set of credit cards based on historical approval rates.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 3 illustrates a block diagram of factors for consideration by a best offer engine in determining credit cards to display to the user, according to some embodiments.

FIG. 4 illustrates an illustrative table for identifying financial (e.g. credit card) offers that the consumer is qualified for, according to some embodiments.

DETAILED DESCRIPTION

Overview

Figure 1:
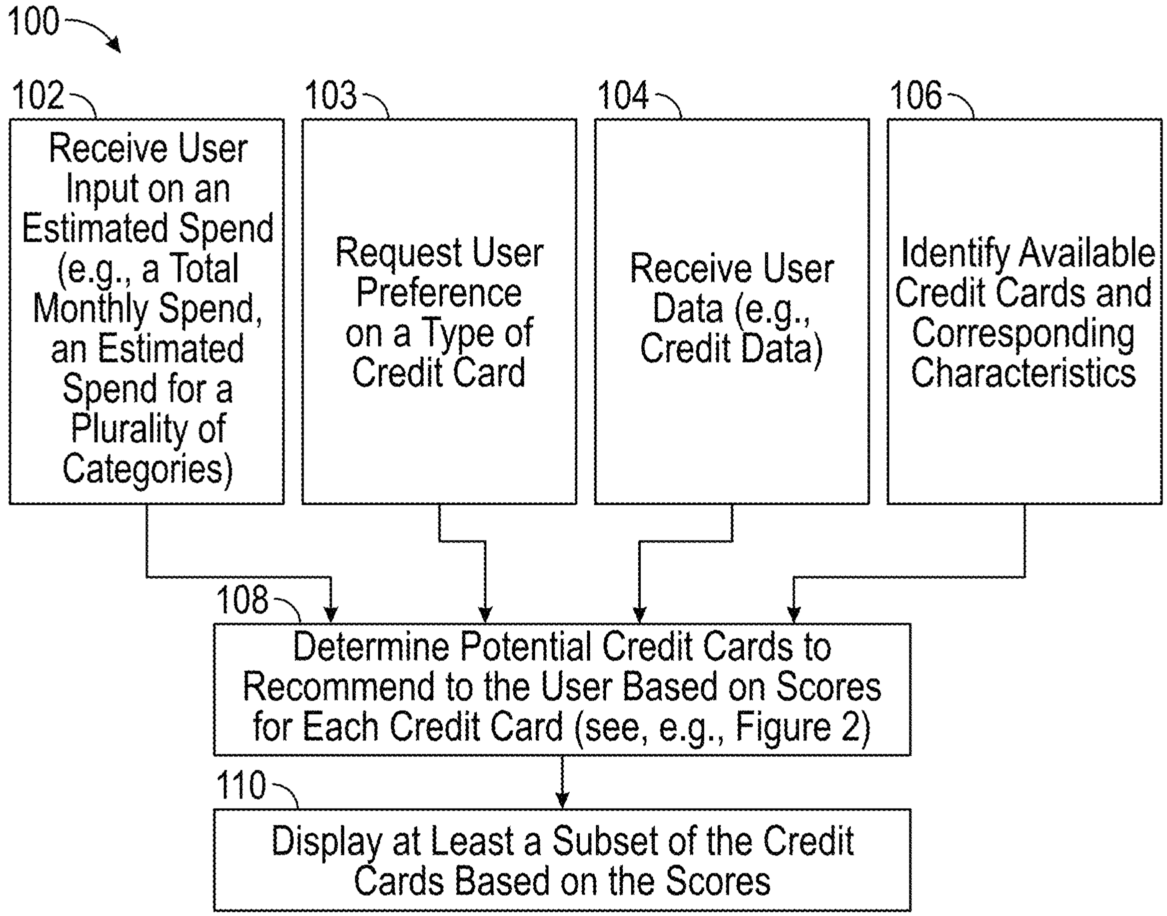
FIG. 1 illustrates a block diagram for displaying credit cards to a user, according to some embodiments.

Oftentimes, the products or services displayed to a consumer are not customized for the customer. Customers oftentimes turn away from websites or interfaces that are not suitable for their particular circumstances.

Moreover, the customer can be presented with products or services that the customer may not be qualified for. For example, the customer may be presented with financial offers (e.g., credit card offers, personal offers, home loan offers, and/or other offers) that may require a credit score (e.g., and/or other risk or rating score) within a credit score range that is outside of the credit score for a particular consumer. As such, the customer is viewing irrelevant products that result in a poor customer experience. The customer can waste browsing time viewing characteristics and applying for irrelevant products. Central to the online environment, a customer may need to navigate through many different websites to be able to identify a relevant product to the consumer. Moreover, given that often times the consumer does not know whether or not they qualify, the consumer can spend an exorbitant amount of time scrolling through websites, identifying products, applying for the products, getting his or her application for the product denied, and repeating the process over again until an application of a product is approved. Not only is the process of scrolling through irrelevant products on various websites difficult for the consumer, the customer's user interface can further be cluttered with a large amount of irrelevant offers, wasting valuable user interface real estate. This is especially important as screens of user computing devices are shrinking in size, such as laptop screens and mobile screens. Displaying irrelevant products or services also result in unnecessary processing of applications for the products or services that the consumer is not qualified for or unlikely to qualify for.

The customer can also be presented with products or services that do not meet his or her particular wants. The customer may have a lot of debt and thus may be looking for a credit card product with balance transfer features to transfer their debt to a credit card with lower interest rates. However, customers may instead be presented with credit cards that are focused on reward points or cash back features. Similar issues (such as the technological issues of user interfaces) are present in these circumstances as in those discussed above in terms of displaying irrelevant products on a monitor or display.

At times, the customer may not know what the customer needs. There may be other products available that provide them with a better benefit than the ones currently owned by the customer. For example, the customer may indicate their desire for a credit card that provides them with cash back. However, the consumer may travel frequently and may spend a certain amount per year, and a particular new credit card may provide the consumer with mileage points that amount to more than the cash back value of the currently owned credit card. Thus, even though a consumer may indicate a preference, the actual preference of a consumer may be different.

Discussed herein is a credit card recommendation system that can provide an improved e-commerce customer experience for online content items, such as product or services. The credit card recommendation system can anticipate a customer's intent based on information personal to the consumer, leveraging the information to present the best content item to meet the consumer's needs, such as providing the best financial offers based on the consumer's credit needs and qualifications for the credit card. The credit card recommendation system can identify a prospective consumer of a content item by looking at the qualifications, the needs, and the wants of like-consumers with similar characteristics.

The credit card recommendation system can provide users with targeted advertisement based on lenders' criteria and behavioral analysis of their wants and needs. The credit card recommendation system can further model the intent of the user. Advantageously, the credit card recommendation system can identify more relevant financial offers for consumers even with a limited set of data available for individual lenders by applying lender criteria. For example, based on a consumer's spending habits or debt portfolio and identifying like-consumers with similar spending and debt, the credit card recommendation system can identify the optimal credit card that the consumer is (1) qualified for, (2) the consumer needs, and (3) the consumer wants. Accordingly, the credit card recommendation system enhances the consumer experience when visiting a credit card comparison site (or other sites or applications offering other products or services) by not only looking at consumer eligibility, but can recommend more relevant content items based on an assessment of consumer intent.

Moreover, the credit card recommendation system can rank the financial offers, such as credit card offers, based on an overall score placing the most relevant on the top of the list. The ranking can be based on a determined unit cost for the rewards, including reward costs and adjustment costs. For example, the unit cost for the rewards can be determined based on credit card characteristics (e.g. annual fee, cash back %, and/or others) and user characteristics (e.g. annual spending amount, paying off debt, and/or others). The rank can be based on behavioral data (e.g., clickstream and/or other data). If the user indicated a request to view balance transfer credit cards, the credit card recommendation system may rank the balance transfer credit cards higher than other credit cards focused on different rewards.

The credit card recommendation system can provide contextual codes that explain, such as in plain English, why certain financial offers were ranked higher than others. The contextual codes can explain that one credit card can provide higher benefits for travel than another credit card based on monthly spend (such as an actual total monthly spend and/or an estimated spend per category for a particular user) and travel expenses.

Example Illustrative Flow of the Credit Card Recommendation System

The credit card recommendation system provides enhanced customer experience by providing content items, such as services or products that are relevant to the customer's qualifications, needs, and wants.

FIG. 1 illustrates a block diagram 100 for displaying credit cards to a user, according to some embodiments. The block diagram 100 can be implemented by any system that can determine potential credit cards to recommend to a user.

Figure 8:
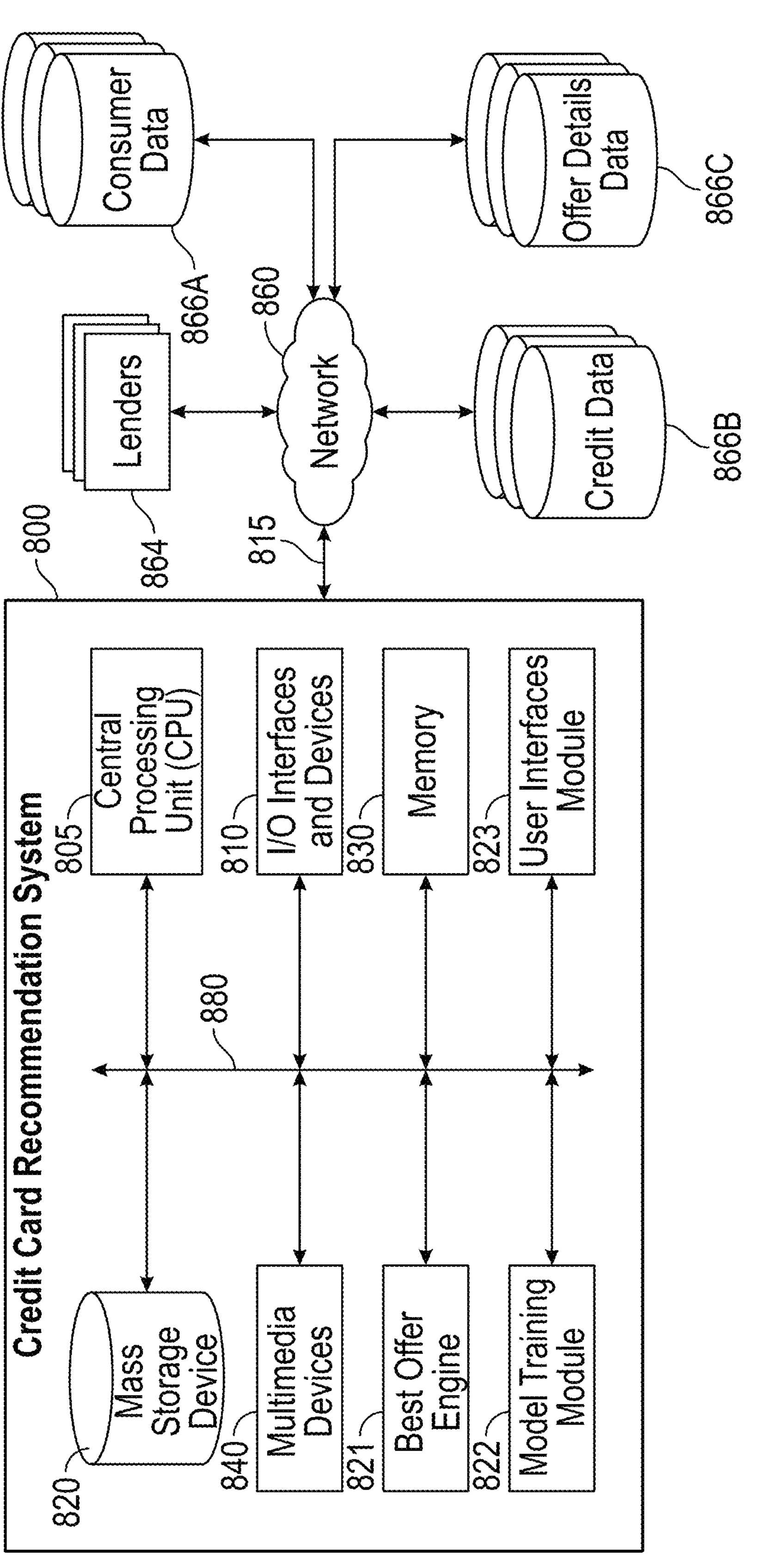
FIG. 8 is a block diagram of an example implementation of a credit card recommendation system in communication with a network and various systems and databases, according to some embodiments.

For example, the block diagram, in whole or in part, can be implemented by a credit card recommendation system 800 of FIG. 8. Although any number of systems, in whole or in part, can implement the block diagram 100, to simplify discussion, the block diagram 100 will be described with respect to particular systems. Further, although embodiments of the block diagram 100 may be performed with respect to variations of systems comprising credit card offer environments, to simplify discussion, the block diagram 100 will be described with respect to the credit card recommendation system.

In some embodiments, the credit card recommendation system can receive user input. The user can log into the credit card recommendation system, via a user computing device. The user can log-in using user credentials, such as a user name and password. The credit card recommendation system can authenticate the user based on information provided by the user, such as user personal information, device identifiers (and/or other device information) of the user device, and/or the like.

At block 102, the credit card recommendation system can request user input regarding an estimated spend by the user. For example, the credit card recommendation system can request that a user input an estimated spend across multiple categories, such as an estimated spend of a user in travel, groceries, restaurants, gas, and/or the like. The estimated spend can be for a period of time, such as a daily spend, a monthly spend, an annual spend, and/or the like. In some embodiments, the credit card recommendation system can request a general estimated spend, such as an estimated average monthly spend across all categories.

At block 103, the credit card recommendation system can request a user preference on a type of reward for a credit card. For example, the credit card recommendation system can display certain credit card types, such as cash back credit cards, travel rewards credit cards, debt transfer credit cards, and/or the like. The user can select one or more of the credit card types as the user's reward type preference.

At block 104, the credit card recommendation system can retrieve user data associated with the user. For example, the credit card recommendation system can request a credit report, such as from one or more credit bureaus, and parse the credit report to retrieve the credit data. The parsed information can include tradelines, outstanding loans, debt information, number of credit inquires, public records, missed payments, and/or the like.

In some embodiments, the credit card recommendation system can retrieve online behavior of the user. For example, the credit card recommendation system can retrieve behavioral data indicating browsing activities of the user. The behavioral data can include previous browsing history, such as a previous visit to a website and the options selected by the user within pages of the website. The behavioral data can be behavioral data of the current session for the user. The behavioral data can be retrieved from an internal database and/or retrieved from a third party, such as user click data on a third party website. The behavioral data can indicate actual offers that the user viewed and/or applied for, goals of a user (e.g. looked at mortgage loans for a house), an indication that the user viewed the user's total debt and related information on how to transfer balances, and/or the like. Such behavioral data may be obtained with user permission, such as by the user indicating that they permit their browsing activity to be used to improve the quality and relevance of their offers.

In some embodiments, the credit card recommendation system can retrieve marketing data associated with the user. For example, the credit card recommendation system can retrieve data on a life goal (e.g. the user will purchase a home), demographic information, household information, employment, interests, likes, dislikes, sex, race, age, gender, hobbies, and/or the like. Such information can help to determine the user's preferences (e.g., the reward type preference) and intent for a future credit card application. The credit card recommendation system can retrieve financial data (e.g. income data) and/or transactional data (e.g. recent credit card purchases) of the user. Income data can be used to determine qualifications for a credit card offer. The user's transactional data can be used to determine user behavior, such as the frequency of paying for gas or understanding the user's preferred retailers.

At block 106, the credit card recommendation system can identify available credit cards and corresponding characteristics. The credit card recommendation system can identify available credit cards in a market place. In some embodiments, the credit card recommendation system can identify the available credit cards by determining which credit cards are already owned by the consumer. Then, the credit card recommendation system can filter out the credit cards already owned by the consumer to process only new credit cards, vice versa, flag the credit cards owned by the consumer, label the credit cards owned by the consumer different than the credit cards not currently owned by the consumer for display, and/or the like.

In some embodiments, the credit card recommendation system can access an offer details table or database that extracts certain information relevant to the financial offers. For example, the offer details table can extract features of the credit card, such as balance transfer information, rewards data, travel points data, and/or other data related to the credit cards. For example, the credit card recommendation system can receive an indication that for a first credit card, spend in travel can provide a 5× bonus in credit card points (meaning, for example, that for every $1 dollar charged to the card, 5 reward points are earned), whereas grocery spend can provide a 2× bonus in credit card points. The offer details table can be populated with features identified by lenders and/or credit card companies. In some embodiments, the credit card recommendation system can scrape the offer details from a lender website. In some embodiments, the credit card recommendation system can access the offer details via an application programming interface (API) with a lender database and/or lender system.

Figure 2:
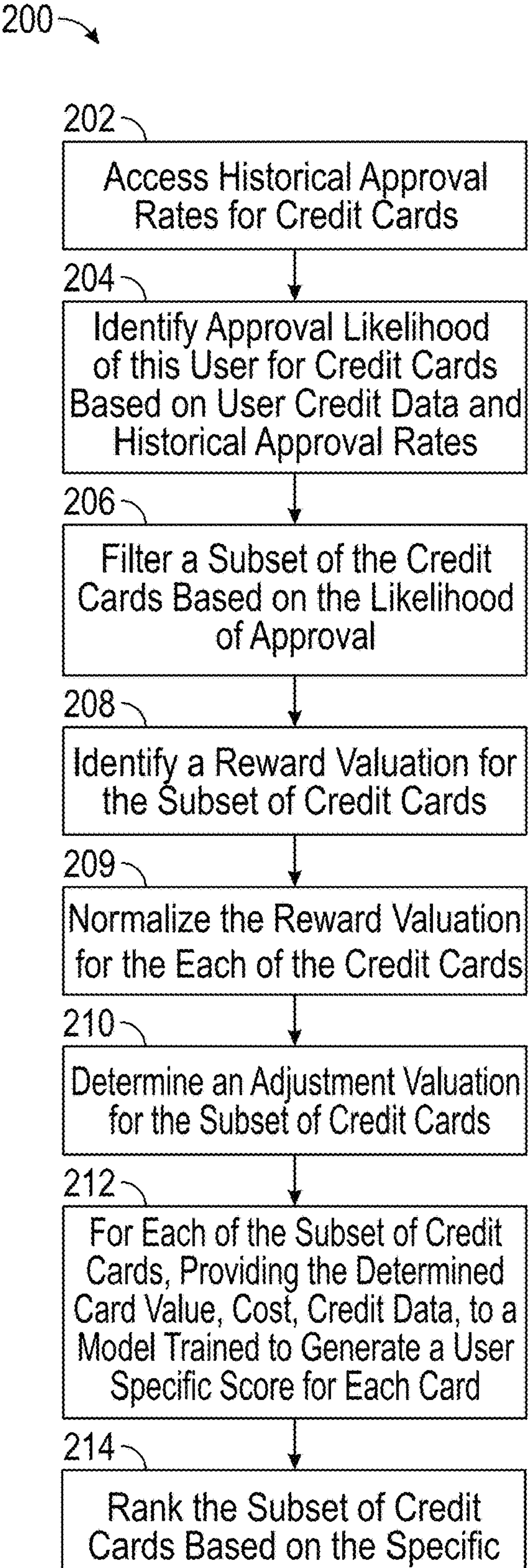
FIG. 2 illustrates a block diagram for determining credit cards to display to the user, according to some embodiments.

At block 108, the credit card recommendation system can determine potential credit cards to recommend to the user based on scores for each credit card. An embodiment of block 108 is illustrated in FIG. 2. The credit card recommendation system can score each of the identified credit cards based at least on an estimated monthly user spend, an estimated spend for a plurality of categories, and user data. Based on the scores, the credit card recommendation system can rank the credit cards and determine potential credit cards to recommend to the user.

At block 110, the credit card recommendation system can display at least a subset of the credit cards based on the scores. The credit card recommendation system can display a subset depending on the scores, such as if the credit cards meet or exceed a threshold score. The credit card recommendation system can display a subset of credit cards depending on the user interface. For example, the credit card recommendation system can display a certain number of credit cards based on screen size and/or user computing system type (e.g., mobile phone or laptop).

In some embodiments, the credit card recommendation system can display the credit cards in the order of the scores. For example, the credit card recommendation system can display the credit card with the highest score at the top. The credit card recommendation system can display other characteristics next to the credit cards. In some embodiments, the other characteristics of the credit cards may not necessarily be in ranking order of the scores. For example, the credit card with the highest score may not be the credit card with the highest reward valuation (e.g., higher dollar amount for points but lower overall score). However, the credit card recommendation system can determine that the credit card should still get the highest score because of a user's preference in a certain category, because the credit card is useful in other regards such as an annual percentage rate (APR), and/or the like.

Example Illustrative Flow of the Credit Card Recommendation System

FIG. 2 illustrates a block diagram 200 for determining credit cards to display to a user, according to some embodiments. The block diagram 200 can be implemented by any system that can score credit cards for a particular consumer. For example, the block diagram 200, in whole or in part, can be implemented by the credit card recommendation system 800 of FIG. 8. Although any number of systems, in whole or in part, can implement the block diagram 200, to simplify discussion, the block diagram 200 will be described with respect to particular systems. Further, although embodiments of the block diagram 200 may be performed with respect to variations of systems, to simplify discussion, the block diagram 200 will be described with respect to the credit card recommendation system.

The block diagram 200 can illustrate an embodiment of block 108 of FIG. 1. The block diagram 200 can include more or less blocks than may be implemented at block 108 of FIG. 1, depending on the embodiment.

At block 202, the credit card recommendation system can access historical approval rates for credit cards. In some embodiments, the credit card recommendation system can make determinations based on actual approvals and/or denials of credit card offers. The actual approvals and/or denials of credit card offers can be received from the consumers, lenders, and/or other entities. The actual approvals and/or denials of credit card offers can be specific for the user. In some embodiments, the actual approvals and/or denials of credit card offers can be for other general consumers and/or other similar consumers that are in the representative sample of consumers.

In some embodiments, the credit card recommendation system can access and/or determine corresponding user data to determine the historical approval rates. For example, the credit card recommendation system can access approval and denial data that are mapped to user credit scores. Advantageously, actual approvals and/or denials of financial offers can be used to provide a more accurate representation of approvals and denials and data to determine reasons why certain users were not approved. Moreover, such data can be used to train models to adjust weights or scores to more accurately estimate whether a user will be approved for a loan. In contrast, simply retrieving credit card tradelines from the credit report does not provide rich data to determine why the consumer was approved, does not provide indications of when and why the consumer was denied a tradeline, and does not include credit card offer benefits data.

At block 204, the credit card recommendation system can identify a likelihood of a credit card approval for a particular user for a number of cards. The likelihood of a user can be based on user credit data and/or historical approval rates. For example, the historical approval rates can indicate that for a consumer in a credit score band between 650-700 has an approval rate of 40% for a first credit card and an approval rate of 60% for a second credit card, whereas another consumer in a credit score band between 700-750 has an approval rate of 50% for the first credit card and an approval rate of 70% for the second credit card.

In some embodiments, the credit card recommendation system can estimate a likelihood of a credit card approval based on users using the credit card recommendation system. A group of users can see a credit card displayed on corresponding displays. At least a subset of the group of users can select the credit card, and the credit card recommendation system can send the users who selected the credit card to the website of the bank corresponding to the credit card to apply for the credit card.

In some embodiments, when the user selects the credit card, the credit card application of the bank lender can be displayed within the website of the credit card recommendation system. Advantageously to the embodiments herein, the consumer can apply for the credit card all within a single user interface, a single browser website, without having to open a new tab on a browser, and without being redirected to another website. The credit card recommendation system can generate a composite website that does not lure visitor traffic away from the credit card recommendation system. As such, the automatic composition of the credit card recommendation system website and the credit card application of the bank system provides improved user interfaces and an improved web browsing experience. In some embodiments, once the consumer clicks on the credit card offer advertisement, the web page may display a bank lender website and/or credit card application that is overlaid on top of the credit card recommendation system web page.

In some embodiments, the credit card recommendation system can provide a link that launches a new tab on a browser. In some embodiments, the credit card recommendation system can launch an application (or provide a button that launches an application), such as a mobile phone application, that was in an unlaunched state. For example, the user can receive a credit card application as a notification, such as a text message or a pop-up, while the application for the credit card is in an unlaunched state. The user can then select the notification to launch the application, improving display interface technology by allowing a user to more quickly access credit card application information stored in the application and/or a corresponding database of the credit card. Such a notification with an unlaunched application improves the technical problem of the user having to open the application and navigate across several interfaces of the application to identify related credit cards. The user can access the application without having to navigate through websites specific to the bank by first searching on a search engine to locate the bank's website, navigating the bank's website to identify credit cards, credit card characteristics, and a relevant offer for the consumer, and applying for the credit card. This enables the user to access the credit card application without having to lose the webpage that the user was currently viewing.

Moreover, such technological links, applications launched on a user computing device, and graphical user interface elements such as buttons enable data that was not available in the past. For example, the credit card recommendation system can store data indicating that a consumer was sent to the bank's website for a particular credit card application. Moreover, the bank can identify that the credit card recommendation system sent the consumer to them for the credit card. This can enable further communication between the credit card recommendation system and the bank for enhanced data analytics, such as determining a more accurate representation of a likelihood of approval for credit card offers.

At block 206, the credit card recommendation system can filter a subset of the credit cards based on the likelihood of the given user receiving approval. The credit card recommendation system can filter credit cards that do not meet a threshold for a likelihood of approval. Advantageously, the credit card recommendation system can determine credit card offers that the user is likely to get approval for, providing more relevant offers for the user.

At block 208, the credit card recommendation system can identify a reward valuation for the subset of credit cards. The credit card recommendation system can determine the value of the benefits and rewards of credit cards based on user data, such as an estimated spend received at block 102 and user data at block 104, and based on credit card characteristics, such as the characteristics identified in block 106. In some embodiments, the credit card recommendation system can determine the value of the credit card based on user spending, such as an annual spend amount.

In some embodiments, credit card recommendation system can determine a reward valuation based on the rewards associated with the credit card for a particular category. The credit card recommendation system can receive an estimated spend across categories and determine a multiplier that the credit card offers for the categories. Then, the credit card recommendation system can determine a point valuation for the credit cards, such as by multiplying the multiplier and the estimated spend for each category, and then aggregating the multiplied values for each of the categories to retrieve a total point valuation. For example, the rewards can include a 5× multiplier for groceries and 2× for gas. The reward valuation appliance 124 can determine, based on a user's estimated spend amount for groceries and gas, how much value (such as the amount of estimated points and/or a dollar amount) the credit card provides to the user based on the application of the spend amount to the multiplier for bonus points. This reward valuation may be determined as the rewards estimated to be obtained by the user over a certain time period, such as within the first year of the user using the new card.

At block 209, the credit card recommendation system can normalize the reward valuation for each of the credit cards. In some embodiments, the credit card recommendation system can normalize the points across various credit cards and/or lending institutions, such as banks. Points in a first credit card may actually be of lesser value than points in a second credit card. The credit card recommendation system can derive a dollar amount for each of the credit cards by normalizing the reward valuation received. For example, two credit cards that allow users to spend their earned reward points on the same products or services (such as retail goods, hotels, flights, etc.) may require that the user spend a different number of points to obtain the same products or services. A first card may allow a user to book a certain hotel room for 20,000 points, while a second card may allow a user to book the same hotel room for 15,000, making each point on the second card more valuable than each point on the first card when used for redeeming points for at least certain travel awards. The normalization process may include retrieving a multiplier or weight for each card that serves to convert a raw point total to a dollar equivalent, which may be specific to one or more uses or award types (e.g., a given card may have relatively valuable points when used to book airfare, but those points may have a relatively low value when redeemed for gift cards or products).

At block 210, the credit card recommendation system can determine an adjustment valuation for each credit card in the subset of credit cards. The adjustment valuation can include an adjustment to the reward valuation. The adjustment valuation can include a determination of monetary value or cost to the credit card, such as a characteristic of a credit card that is not related to points awarded for consumer spend. For example, the adjustment valuation can include an annual membership fee and/or estimated interest to be charged. For example, the annual membership fee of a credit card can be $300. The expected interest accruing on a credit card can be based on promotions, such as a 0% an annual percentage rate (APR) for the first year and 20% APR for the subsequent years. The interest can be determined based on an expected total monthly spend of a user. The interest can be a factor of the debt to be transferred over, a monthly estimated total spend of the user, and/or an estimated payoff of the balance on the credit card over a period of time. The system may predict the likelihood and/or amount of a balance that the user may carry on the card, which may be based on a combination of user input (such as the estimated spend entered by the user) and credit data of the user (such as whether and how much debt or balances are outstanding on other accounts of the user). The estimated balance and the card's APR may be used to determine an interest-related dollar cost of the card over a certain period (such as a year), which may be a separate estimated cost to the user above and beyond the annual membership fee of the card. In some embodiments, the adjustment valuation can be subtracted from the normalized reward valuation in block 208 to determine a card value. In some embodiments, the reward valuation and/or the adjustment valuation can be a positive or negative number or value.

In block 212, the credit card recommendation system can, for each of the subset of credit cards, provide the determined card value (such as the subtraction between the normalized reward valuation and the adjustment valuation), user credit data, and/or other inputs to model in the best offer engine to generate a user specific score for each card (such as the inputs described in FIG. 3), as will be further described below.

In some embodiments, the credit card recommendation system can generate, train, and/or apply models, such as custom models to generate a score for a credit card. The models can be trained based on historical data and then subsequently used to generate a score specific to a particular user. For example, the custom models can be trained to generate a score for the credit card based on estimated monthly user spend, an estimated spend for a plurality of categories, user data, and/or the like.

In some embodiments, the credit card recommendation system can apply input data to models to generate the scores for credit cards specific to the user. For example, the credit card recommendation system can train a credit scorecard to determine and adjust weights to apply to various inputs to receive an output score. The scorecard can include a lookup table that maps specific ranges of the inputs to certain points. Then, the scorecard can aggregate the points to determine a final score for the user. For example, credit scores can be segregated into bins, where a score between 650-700 corresponds to 6 points, 700-750 corresponds to 8 points, and 750-800 corresponds to 10 points. Another input can include a normalized reward valuation where a normalized valuation reward of $600-800 can correspond to 5 points, $800-1000 to 10 points, and $1200+ to 15 points. If the user has a credit score of 720 and based on the user's category spend, the normalized reward valuation is $700, the points for these two inputs can be 8 points and 5 points. Then, the scorecard model can add each of the points to get a total point value for the credit card.

In some embodiments, the credit card recommendation system can train the models to generate the scores. The credit card recommendation system can train the models by applying test input data to the models, receiving the output of the models, and adjusting the bins and corresponding points. The credit card recommendation system can train the models using logistic regression models by scaling a scorecard to make the scorecard form to a particular range of scores and regression coefficients, which are later used when applying the scorecard to an individual consumer. The credit card recommendation system can train the models using historical user data and/or fictitious data that comprises user data and an indication of a desired score for that user.

In some embodiments, the models can include artificial intelligence and/or machine learning algorithms, such as neural networks, linear regression, logistic regression, decision tree, naive bayes, and/or the like. The models can be trained using historical data to adjust the models, such as adjusting the weights to nodes by forward propagating input values through the nodes of the neural network, back propagating the output value, and adjusting weights of corresponding nodes.

At block 214, the credit card recommendation system can rank the subset of credit cards based on the specific score for each card. For example, the output of the score card can indicate a final score of 90 for the first credit card, 25 for the second credit card, and 50 for the third credit card. The credit card recommendation system can rank the credit cards as the first credit card, the third credit card, and the second credit card.

Advantageously, the credit card recommendation system can display relevant offers based on a ranking of credit cards for the user. The relevant offers, as described in more detail herein, can be determined based on what the consumer can qualify more (e.g., based on a likelihood of approval), reward valuation specific to the user's estimated spend (e.g., estimated spend across a plurality of categories), a normalized reward valuation (e.g., normalizing credit card points to a dollar value), adjustment valuation (e.g., total spend, debt, APR), a score for a credit card (e.g., generated by a trained machine-learning model) and/or the like.

By displaying more relevant offers to the consumer, the user can identify more relevant offers quickly without having to navigate through websites specific to the bank by first searching on a search engine to locate the bank's website, navigating the bank's website to identify credit cards, credit card characteristics, and a relevant offer for the consumer, and applying for the credit card. This enables the user to access multiple credit card applications via a single user interface (further described herein) and/or without having to lose the webpage that the user was currently viewing.

Moreover, the credit card recommendation system solves the technical problem of having limited user interface real estate that may be cluttered with irrelevant offers, and instead identifies the relevant offers to present to a user interface. Furthermore, by displaying credit card applications that the user is likely to get approval for, the credit card recommendation system reduces unnecessary processing of applications by bank servers that the consumer is not qualified for or unlikely to qualify for. This is especially important as screens of user computing devices are shrinking in size, such as laptop screens and mobile screens.

In addition, the credit card recommendation system can receive input from the user and process user data in the models, train the models, access sensitive data such as credit scores, financial and transactional data, and user personal information to generate relevant offers for the user. Such processing by the credit card recommendation system can be performed on the server side. Because one or more of the processes of the credit card recommendation system can perform the block diagrams 100 and/or 200 on the server side, remote from a client computing device, the processors can analyze large amounts of data, run complexed algorithms, and have access to databases that may not be able to be performed on a client computing device, such as a mobile phone or a laptop. Accordingly, this provides a technological advantage, as the processing can be performed without being dependent on the hardware, operating system, and/or software of a client computing device. Moreover, such processing on the server side can result in faster processing with more processing power of servers, rather than being limited to the processing power of a client device (such as a mobile phone or laptop). Furthermore, remote processing can improve on data privacy and network communication security, as sensitive data, such as financial, personal, or credit data do not have to be passed to and from the user device over the Internet.

Moreover, training of models, such as artificial intelligence models, is necessarily rooted in computer technology, and improves on models by using training data to train such models and thereafter applying the models to a new set of user data. For example, training a scorecard model can include comprehensive processing. Training a scorecard can include applying training data and performing logistical regression to identify the bins and/or the points allocated to the bins for a scorecard. Such training involves complex processing that typically requires a lot of processor computing and extended periods of time with large training data sets. Training of models can require logistic regression or forward/backward propagating of training data that can include input data and expected output values that are used to adjust parameters of the models. Such training is the framework of machine learning algorithms that enable the models to be applied to new data (such as new consumer data) and make predictions that the model was trained for based on the weights or scores that were adjusted during training. Such training reduces false positives and increases the performance of detection of relevant offers.

In some embodiments, for example, the credit card recommendation system can determine the number of potential credit cards to display based on screen size and/or user computing system type (e.g., mobile phone or laptop). Advantageously, the credit card recommendation system can automatically adjust the number of credit cards to display based on the available user interface real estate.

Example Embodiments of Intent-Based Modeling

In some embodiments, the models can be trained to indicate an intent of the user, such as a user's intent to apply for a certain type of credit card. The models can be trained to determine if the user is looking for a balance transfer credit card that allows consumers to transfer high interest rate credit card balances onto a credit card with a low interest rate. For example, the models can be trained to identify that the user is looking for balance transfer credit cards based on the user's behavioral data, where the user accessed debt strategic recommendations, and/or based on the user's credit data, such as a large credit card debt balance.

In some embodiments, the models can be trained to indicate that the user is looking for a credit card that provides rewards. Rewards credit cards incentivizes users to make purchases with credit cards to accumulate points for each dollar charged on the card. Cardholders can then redeem these points for various awards. Reward cards often require higher credit for approval. Thus, the models can be trained to apply a greater weight if a user's credit score is higher to determine whether the user is a rewards credit card seeker. The models may look at other user data, such as marketing data, transactional data, and/or the like to determine that the user likely is intending to sign up for a rewards credit card.

In some embodiments, the rewards credit cards include cash back credit cards that allow consumers to earn cash rewards for making purchases. The more the card is used, the more cash rewards the consumer receives. The cash back rewards can come in the form of a check or gift cards. Reward credit cards can include hotel and travel awards, where points can be spent on free stays at a hotel or redeemed for travel, theme park admissions, and/or the like. Rewards credit cards can also include retail rewards credit cards that are associated with major retailers, where points can be redeemed at the retail stores. Rewards cards can include gas rewards credit cards, which can be a good fit for consumers with a long daily commute or working as a contract driver.

In some embodiments, the models can be trained to identify that the person is looking for a loan, such as a secured or unsecured loan. The trained model can apply weights to criteria, such as whether the user previously applied for a mortgage loan or has searched for used cars, which may be an indication that the user is looking for a loan.

In some embodiments, the models can be trained to determine the intent of the user to pay a deposit on a secured credit card. Secure credit cards typically require a predetermined amount in order to secure the card.

In some embodiments, the model may be trained to determine that the user has low credit from the user's credit data but is looking to build and/or rebuild their credit history.

In some embodiments, the models can be trained to determine the intent of the user to need and/or want specific offers. Certain offer features may make an offer more or less appealing to a consumer and indicate their likelihood to abandon an application before application completion.

In some embodiments, the models can be trained to determine the intent of the user to be looking for a specific feature in an offer. A specific feature can be items such as rewards, introductory balance transfer rates and/or the like. The model may be trained to determine that the user is looking for more of a rewards offer to maximize their use of the product.

In some embodiments, the models can be trained based on a representative sample of consumers with similar user data as the user, such as credit score, interests indicated by the behavioral data, marketing data, attribute scores, and/or the like. The models can be trained to identify an intent of a user, which can later be applied to financial offers in order to determine more relevant offers for the user.

Example Illustrative Block Diagram of Factors for the Best Offer Engine

FIG. 3 illustrates a block diagram 300 of factors for consideration by the best offer engine in determining credit cards to display to the user, according to some embodiments. The factors for the best offer engine 302 can include an estimated user spend for categories 304, user credit data 306, user stated preference 308, user financial and transactional data 310, user intent 312, credit cards currently owned by the user 314, new credit cards available for the user 316, credit card reward valuation 318, credit card cost (or adjustment) valuation 320, user online behavior 322, and/or credit card characteristics 324.

In some embodiments, the model in the best offer engine can be trained for the estimated user spend for categories 302. The training data can include data that trains the model to weigh or score certain spend amounts for particular categories. For example, for a credit card with higher travel points, the model can be trained to weigh more or score higher for estimated user spend in the travel category.

In some embodiments, the model in the best offer engine can be trained for user credit data 306. The model can be trained to weigh or score based on credit data, such as a credit score. The model can adjust the weights based on the credit card requirements. For example, a model can weigh or score a first credit card with a high credit score requirement more based on a user's credit score.

In some embodiments, the model in the best offer engine can be trained for a user stated preference 308. The user can state his or her preference for a reward type of credit card, such as a cash back or debt transfer card. The model can weigh cash back or debt transfer credit cards higher than others.

In some embodiments, the model in the best offer engine can be trained for user financial and transactional data 310. The credit card recommendation system can access financial data, such as income data, to determine a score for the credit card, such as adjusting the score or weight based on the income requirements of the credit card.

In some embodiments, the credit card recommendation system can access transactional data and determine a more accurate estimated total spend and/or spend per category. The transactional data can indicate an amount spent on an item and other additional data such as merchant information. The credit card recommendation system can identify the category based on the additional information and aggregate total amounts spent for each category. The credit card recommendation system can then apply the actual amounts spent for each category to the model, and the model can identify a score based on actual amounts spent.

In some embodiments, the actual amounts spent for each category based on the transactional data can be applied to other features, such as when determining reward valuation in block 208 or cost valuation in block 210.

In some embodiments, user intent 312 can be derived by models, such as the models described above that determine what the user wants based on user information. The model can apply weights or scores to various types of user intent to identify a score for a particular credit card (or a set of credit cards).

In some embodiments, the credit card recommendation system can identify credit cards currently owned by the user 314 and new credit cards available for the user 316. In some embodiments, a lower score or weight can be applied by the model to credit cards currently owned by the user, and higher score or weight applied to new credit cards, or vice versa.

In some embodiments, the credit card recommendation system can apply a credit card reward valuation 318 and/or a credit card cost valuation 320 to the model. The model can generate a score for the reward valuation and/or the cost valuation.

In some embodiments, the credit card recommendation system can apply user online behavior 322 to the model. For example, the model can take into account click-through-rates of offers presented to the user. The model can score spending habits, such as paying off credit card balances, into the model (e.g., when factoring in interest rates on credit cards).

In some embodiments, the credit card recommendation system can generate and/or access a firm offer of credit (FOC), such as if the user has already been qualified for an offer based on past user applications. The credit card recommendation system can identify based on user online behavior data that the user was presented with an offer and/or that the user clicked an offer but had not completed the application. The model may weight that a redisplay of offers that have already been communicated may be effective and may score users that have clicked the offer in the past higher. The credit card recommendation system can redisplay the same offer on the user's graphical user interface on the user computing device when the user is browsing the webpage or is targeted via another digital channel such as email, SMS or digital notification, to see the same offer again. In some embodiments, financial offers from the credit card recommendation system can be distinct from other offers, with a distinct communication on the graphical user interface. In some embodiments, the credit card recommendation system can trigger a redisplay after a predetermined period of time. In some embodiments, the credit card recommendation system will not trigger if an expiration date has passed.

In some embodiments, the credit card recommendation system can apply credit card characteristics 324 to the model. The model can be trained for a particular card and/or a credit card. The model can be trained to score user data for travel cards, and another model trained to score for debt transfer cards. In some embodiments, the model can be trained for a plurality of cards or card types.

In some embodiments, the credit card recommendation system can generate and/or access an exception table of a lender and apply the exception table to the model. The exception table can include a list of user identifiers that the lenders do not want to make offers to and/or user identifiers that the lenders do want to make offers to. For instance, Bank A includes a whitelist of users that Bank A wants to make offers to, such as users that already have accounts with Bank A. The lender can provide a blacklist of users that the lender does not want to make offers to, such as users that have bad credit. The exception table can be used to identify whether the user is on a whitelist or a blacklist, and the Bank A can be flagged and/or removed from the list of available offers for the user. In another example, the exception table can include a whitelist and a blacklist, such as including military personnel but excluding non-military personnel.

In some embodiments, the credit card recommendation system can use the exception table to determine any financial offers available to the user based on the lender criteria including the whitelist of users for which credit card offers may be made and/or a black list of user for which credit card offers may not be made.

In some embodiments, the credit card recommendation system applies lender strategies to the model that applies lender qualification criteria using attributes for the financial offers. The user attributes are assessed with respect to the strategy, and the user attributes are applied to the lender qualification criteria to identify qualified financial offers for the user. In some embodiments, the application of the lender qualification criteria can occur separately for each lender and/or for a plurality of lenders. The credit card recommendation system can receive offer codes that the lenders want to make.

Example Illustrative Table of the Credit Card Recommendation System

FIG. 4 is an illustrative table for identifying financial (e.g. credit card) offers that the consumer is qualified for and that the consumer wants, according to some embodiments. The table can include a range of credit scores, such as score bands of 450-500, 500-550, and/or the like.

In some embodiments, the table can include various offers that the consumer likely wants. For example, the various offers that the consumer likely wants can be identified by the custom models and/or the best offer engine described herein. The consumer can be identified as a consumer that travels frequently and likely would be interested in a travel rewards credit card. The table can categorize the credit cards based on type, and display travel rewards credit cards as higher priority. The credit cards can be categorized by bank, such as bank 1 and bank 2, where each bank corresponds to a vendor code, such as ABC123 and DEF456. The financial (e.g. credit card) offers can be identified by an offer name, such as credit card A, and an offer code, such as A555444. The financial (e.g. credit card) offers can be placed into a row associated with the vendor providing the financial (e.g. credit card) offer. Thus, each credit card offer (or other financial or non-financial offer in other embodiments) may be separately indicated in the table, e.g., a particular lender that offers 6 different credit cards would have 6 different offer codes in the table.

In the example of FIG. 4, financial (e.g. credit card) A offer corresponding to the offer code A555444 has approval rates of 13.44% for credit scores of 550-600, 14.44% for 600-650, and 10.21% for 650-700. The approval rates can be retrieved for consumers that are in a representative sample as the consumer. The representative sample of consumer can be identified based on similar user data, such as a similar credit score, similar income, similar debt-to-income ratio, similar credit utilization, similar employment, similar demographic, and/or the like.

Financial (e.g. credit card) A offer may not have similar consumers applying for it, since similar consumers in the higher credit score range may be applying for cards with better benefits. Consumers with lower credit scores may not be applying for the cards knowing they will likely be denied the offer.

Financial (e.g. credit card) B and C offers of FIG. 4 illustrate financial (e.g. credit card) offers that were excluded. For example, the financial (e.g. credit card) B and C offers may be excluded based on a blacklist from the vendor, excluded based on irrelevancy to the identified custom model for the consumer, excluded based on vendor criteria such as a pre-qualification criteria, and/or the like.

Financial (e.g. credit card) I offer of FIG. 4 does not have approval data for the consumer. This may indicate that the consumer is not eligible for the credit card, even with a certain credit score, that the system does not have actual approval data for this financial (e.g. credit card) offer for the representative sample of consumers, and/or the like.

In some embodiments, credit card recommendation system can use the table to filter out financial offers from being shown to consumers in certain score bands where approval rates are too low and/or restrictive. The table can include one axis that indicates an approval percentage for the financial offers based on credit data. For example, the table can include approval percentages for financial offers based on a credit score of a user and/or credit scores of other similar users who have applied for the corresponding financial offers.

In some embodiments, the table can include an indication of whether the user wants the financial offer. The indication of whether the user wants the financial offer can be determined based on the custom models. For example, the custom model may indicate that the consumer wants a rewards based credit card. The table can identify financial offers that are rewards based and indicate which of the rewards based financial offers the user is likely to be able to get approved based on the actual approval percentage.

In some embodiments, the table can be used to identify whether the user wants the financial offer based on a click through approval. For example, for the user and/or for the representative sample of consumers that are similar to the user may have a high clickthrough approval for balance transfer credit cards. Because the user and/or the representative sample of consumers have selected balance transfer credit cards, these type of credit cards may be selected for the table and may be identified as potential credit cards that the user wants.

In some embodiments, the table can be used to identify consumers that may have credit scores that can likely get approval for the offer but other users have not applied for the offer. Thus, the table can identify offers that are below the standards of the user based on the credit data.

In some embodiments, the credit card recommendation system can estimate a characteristic indicative of the likelihood of approval that is different than the actual likelihood of approval for a user. For example, the credit card recommendation system can track interactions with the user when the user is presented with the credit card offers. The credit card recommendation system can identify how many users have selected the credit card offers and keep records of who the users are in order to later determine which of these users actually obtained the card.

In some embodiments, the credit card recommendation system can identify new trade lines appearing on a credit report. From the new trade lines, the credit card recommendation system can match the user with the new trade line with a user that selected the credit card offer. Advantageously, the credit card recommendation system can determine a relative indication of the likelihood of approval based on the match. The credit card recommendation system can determine a relative click-to-approval rate of the users. Moreover, the credit card recommendation system can match the user with the credit score band. Advantageously, the credit card recommendation system can identify an indication of relative click-to-approval rate of users for the credit card in each credit score range without sensitive data being passed from one entity to another entity through the Internet or other network, improving data privacy of personal and financial data.

Example Illustrative Graphical User Interfaces of User Input

Figure 5A:
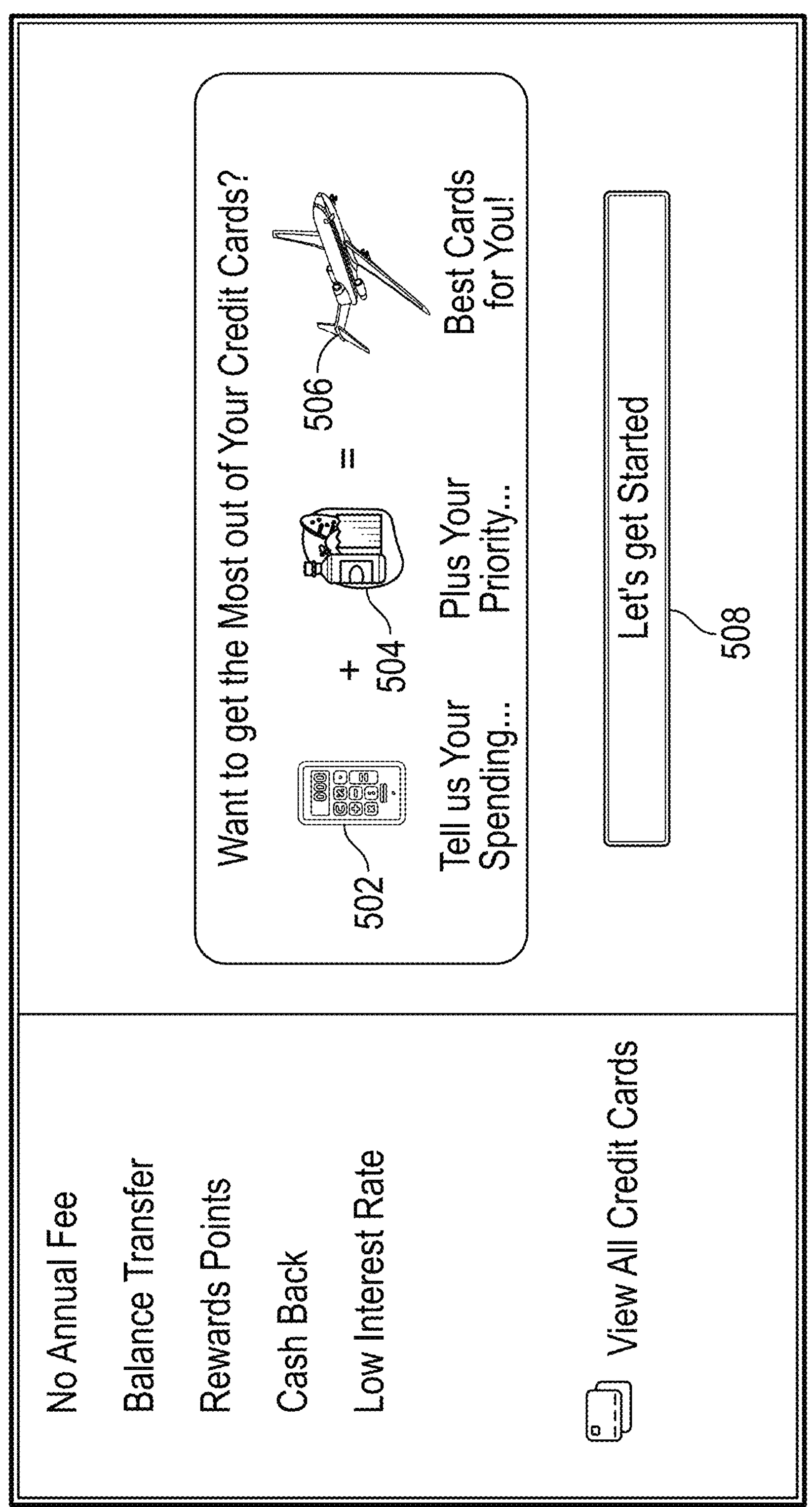
FIG. 5A illustrates a user interface for initiating customized recommendation of credit cards, according to some embodiments.

FIG. 5A illustrates a user interface 500 for initiating customized recommendation of credit cards, according to some embodiments. The graphical user interface of FIG. 5A illustrates an introduction to the consumer for the credit card recommendation system. The user interface 500 displays the intention of receiving user input on spending 502, requesting for a user reward type preference in priority for credit card types 504, and providing the best credit cards for the consumer 506. The user interface illustrates a graphical user interface element 508 that may be selected by the user to begin the process for identifying relevant offers.

Figure 5B:
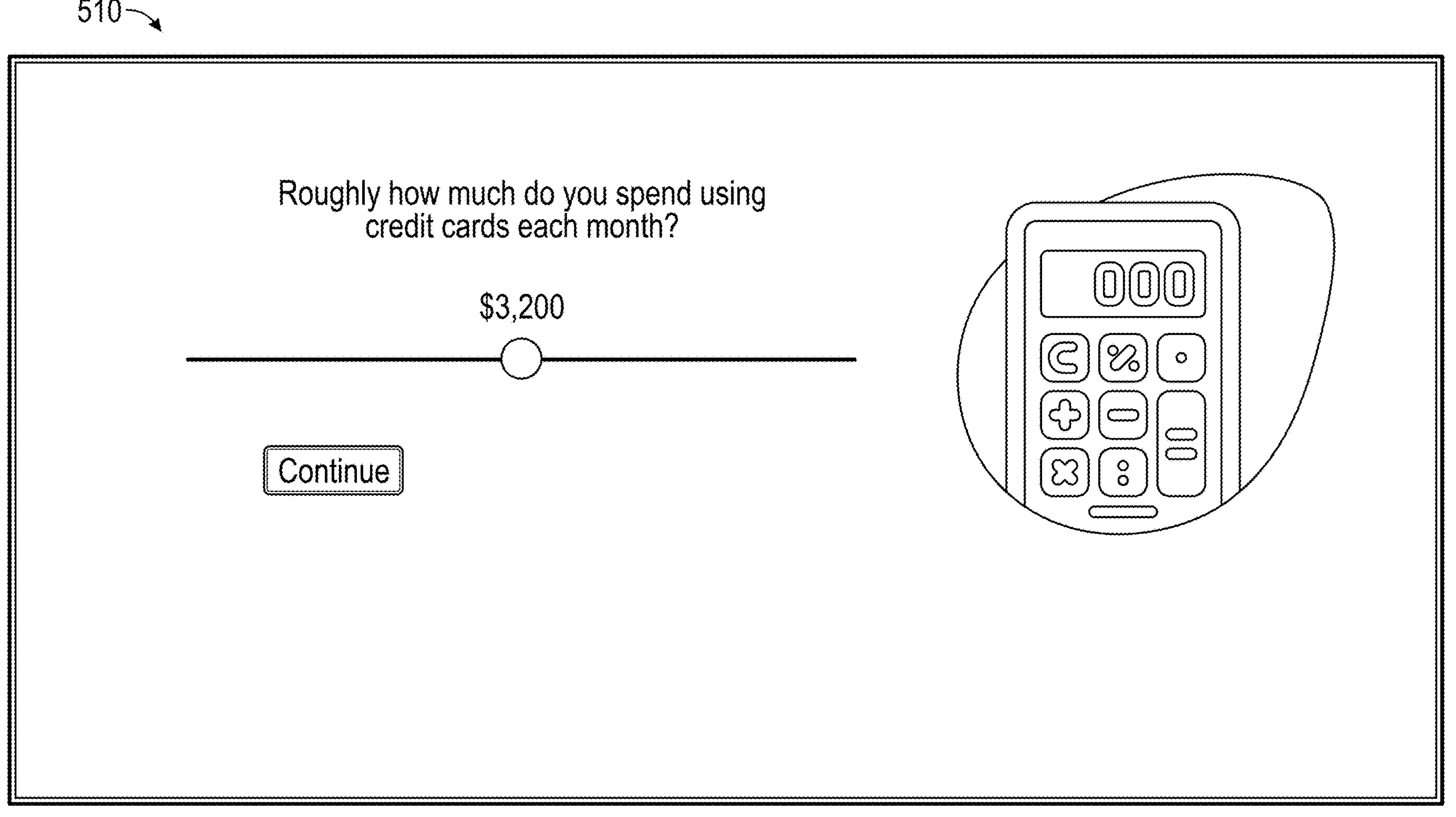
FIG. 5B illustrates a user interface for requesting an estimated monthly total spend, according to some embodiments.

FIG. 5B illustrates a user interface 510 for requesting an estimated monthly total spend, according to some embodiments. The user interface 510 displays a request for an estimated monthly amount of spend from the user. The user interface 510 includes a graphical user interface element that is in the form of a slide bar to adjust the estimated amount, which is currently set to $3,200.

Figure 5C:
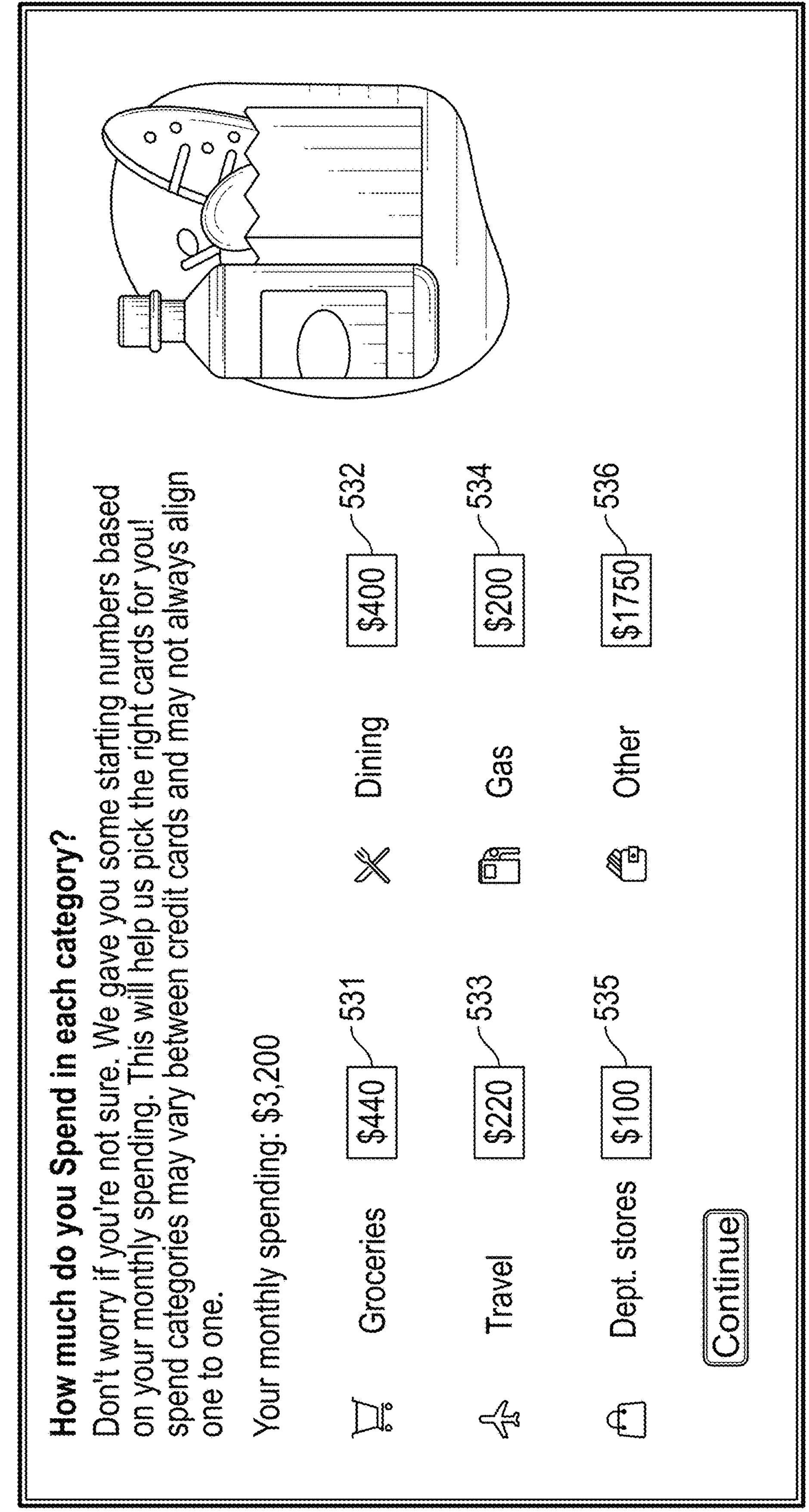
FIG. 5C illustrates a user interface for requesting an estimated spend for a plurality of categories, according to some embodiments.

FIG. 5C illustrates a user interface 520 for requesting an estimated spend for a plurality of categories, according to some embodiments. The user interface 520 illustrates the monthly spending $3,200 that was selected by the user in the user interface 510.

In some embodiments, the user interface 520 includes several input elements that correspond to various categories. The input element 531 corresponds to the groceries category. The input element 532 corresponds to the dining category. The input element 533 corresponds to the travel category. The input element 534 corresponds to the gas category. The input element 535 corresponds to the department stores category. The input element 536 corresponds to the "other" category (which may represent credit card spending that does not fit another category in the user interface).

In some embodiments, the credit card recommendation system automatically populates the input elements based on the monthly spending received in user interface 510. For example, the monthly spending in FIG. 5B was $3,200. Thus, the automatically populated numbers are $440, $220, $400, $200, $100, and $1750, which total $3,110, a number close to the monthly spend received in FIG. 5B. The automatically populated numbers can be based on a general percentage of the estimated monthly spend, a weight applied to each plurality of categories, and/or the like. The weights can be a general weight for all users, can be applied for similar consumers with similar characteristics (e.g., similar credit score, similar spending habits based on transactional data, similar income), or specific to the consumer (e.g., based on actual transactional data).

Figure 5D:
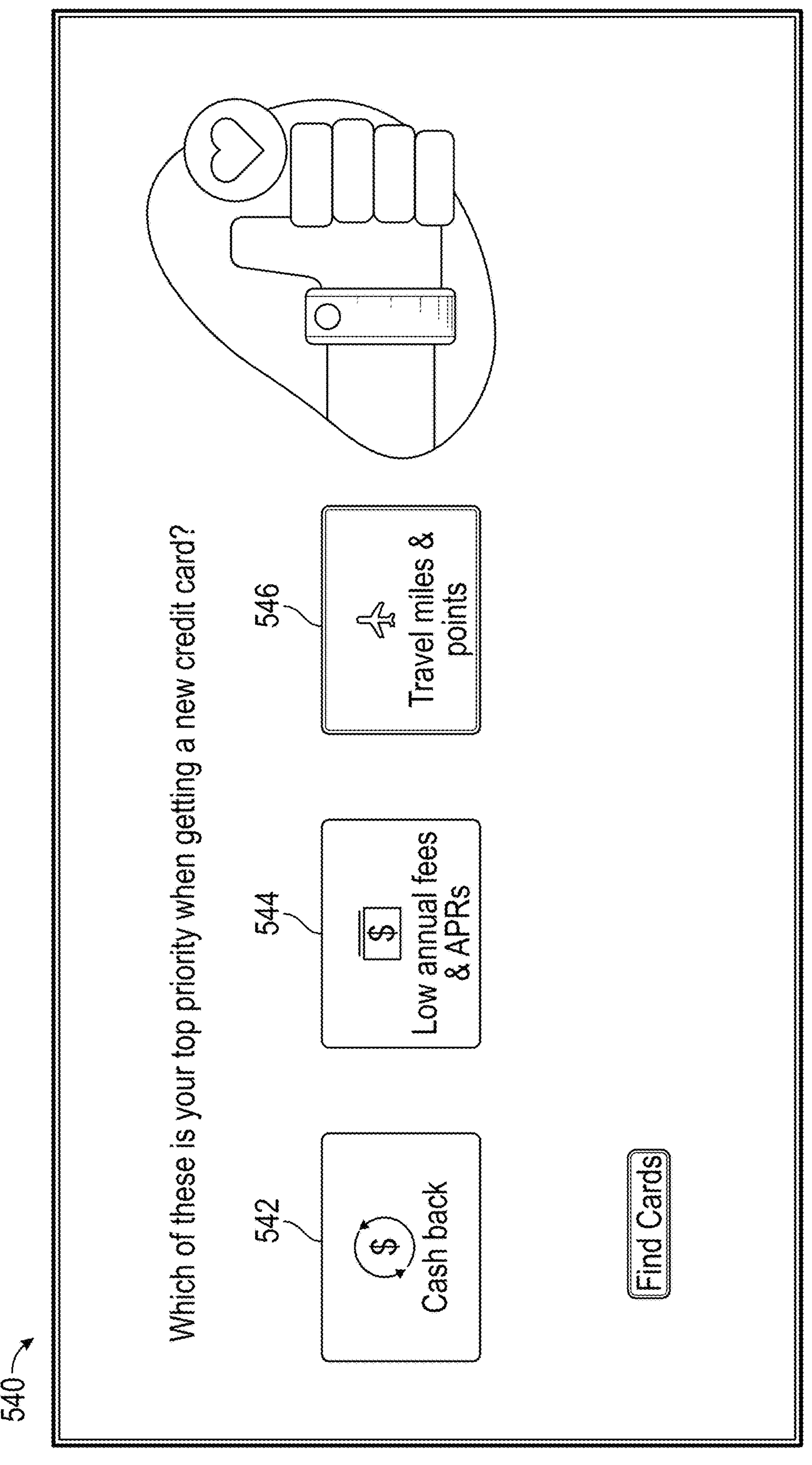
FIG. 5D illustrates a user interface for requesting a user's priority on the reward type of credit card desired, according to some embodiments.

FIG. 5D illustrates a user interface 540 for requesting a user's priority on the reward type of credit card desired, according to some embodiments. The user interface 540 can request from a user a preference of priority for a reward type of a credit card. The user interface 540 can display different types of credit cards, such as a cash back credit card 542, a low annual fees and APR credit card 544, and a travel miles and points credit card 546. The user can select one or more credit card types on the user interface 540 to indicate his or her preference. In some embodiments, the selection can include a numerical priority (e.g., 1-10 scale), a ranking (e.g., $1^{st}$, $2^{nd}$, $3^{rd}$), a selection of the credit cards (e.g., radio button), and/or the like.

Example Illustrative Graphical User Interfaces of Recommended Credit Cards

Figure 6A:
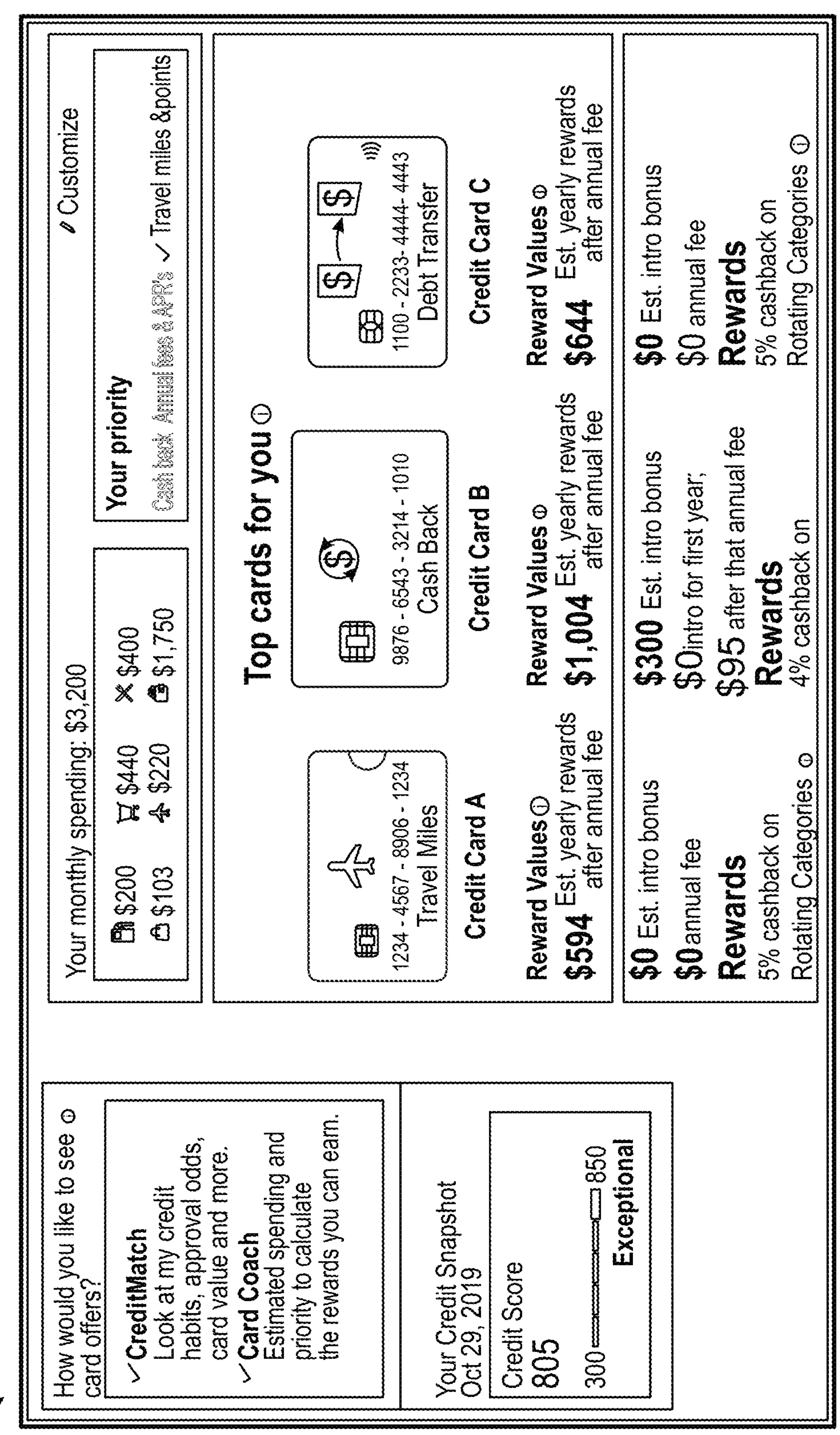
FIG. 6A illustrates a user interface for displaying credit cards ranked based on a score and displaying reward values for the credit cards, according to some embodiments.

FIG. 6A illustrates a user interface 600 for displaying credit cards ranked based on a score and displaying reward values for the credit cards, according to some embodiments. The graphical user interface 600 of FIG. 6A illustrates credit cards displayed in order of ranking based on scores for each of the credit cards. The user interface 600 displays Credit Card A, Credit Card B, and Credit Card C, from highest to lowest score. The user interface 600 explains that the credit cards were selected based on credit habits, approval odds, card value, estimated spending, and priority.

In some embodiments, the reward valuation can be displayed on the user interface. For example, Credit Card A has a rewards valuation of $594, Credit Card B has a valuation of $1,004, and Credit Card C has a valuation of $644. As displayed in the user interface 600, the order in which the credit cards are displayed may not necessarily be the same as certain characteristics, such as the reward valuation.

In some embodiments, the user interface 600 can illustrate certain cost valuations, such as an estimated introduction bonus or annual fee, and/or the like. The user interface 600 can illustrate certain rewards on the cards, such as percentage cash back rewards.

In some embodiments, the user interface can display the priority selected by the user. The user interface 600 displays the selection of travel miles & points, with other selections such as cash back and annual fees & APR in lighter font text.

In some embodiments, the credit card recommendation system identifies the size of the screen and/or the type of the user computing device to determine the number of cards to recommend. In the user interface 600, the credit card recommendation system determines that the user computing device is a laptop and determines to display three cards.

Figure 6B:
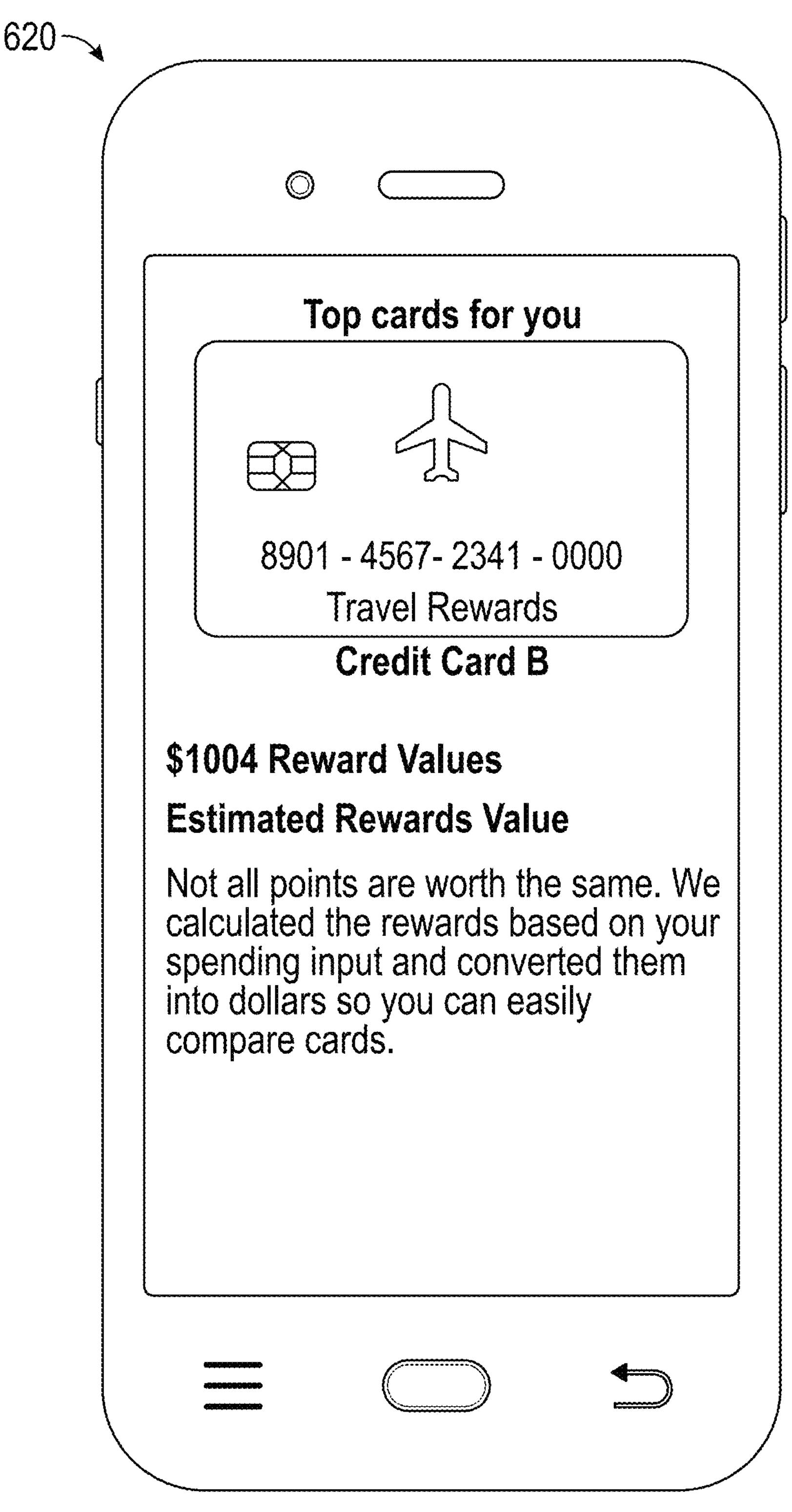
FIG. 6B illustrates a user interface on a mobile phone displaying credit cards ranked based on a score and an explanation on the estimated rewards value, according to some embodiments.

FIG. 6B illustrates a user interface 620 on a mobile phone displaying credit cards ranked based on a score and an explanation on the estimated rewards value, according to some embodiments. In the user interface 620, the credit card recommendation system determines that the user computing device is a mobile phone and determines to display a single card.

In some embodiments, the graphical user interface displays contextual codes. The contextual codes can be displayed for a particular financial (e.g. credit card) offer that indicates in plain English reasons for a credit match percentage or rewards value. In the example of FIG. 6B, the reasons described for the $1004 rewards value is that not all of the points are worth the same, and is explaining that the points are normalized across credit cards. The contextual codes further explain that the rewards are based on spending input and converted into dollars for easy comparison. In some embodiments, the contextual codes can indicate a value of the amount that can be saved and/or earned based on an estimated use by the user of the displayed credit card.

Example Illustrative Graphical User Interfaces of Recommending New Credit Cards

Figure 7A:
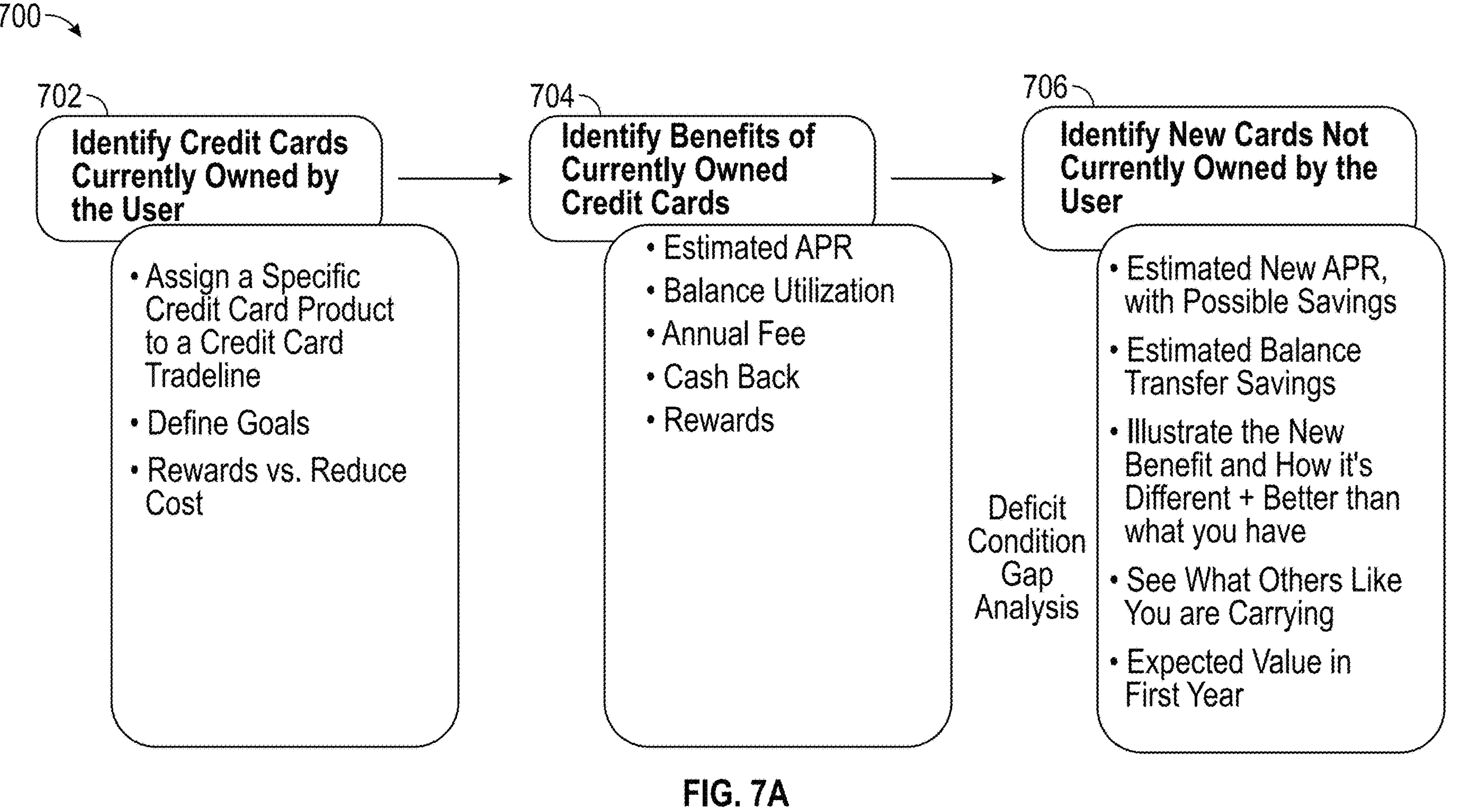
FIG. 7A illustrates a diagram for seeing benefits of existing cards and providing recommendations on new cards, according to some embodiments.

FIG. 7A illustrates a diagram 700 for seeing benefits of existing cards and providing recommendations on new cards, according to some embodiments. The diagram 700 illustrates the flow of decisioning to recommend new credit cards according to some embodiments, such as by identifying credit cards currently owned by the user 702, identifying benefits of currently owned credit cards 704, and identifying new card not currently owned by the user.

In some embodiments, the credit card recommendation system can identify credit cards currently owned by the user. The credit card recommendation system can identify credit cards based on parsing trade lines in a credit report, and can assign a specific credit card product to the credit card tradeline. The credit card recommendation system can request the user to enter in credit cards currently owned by the user. The credit card recommendation system can request from banks user information on users currently owning a credit card associated with the bank.

In some embodiments, the credit card recommendation system can request further information from the user, such as asking about goals (e.g., life goals of a user), and determining rewards and costs specific to the user (e.g., reward valuation and cost valuation based on user spend).

In some embodiments, the credit card recommendation system can identify benefits of currently owned credit cards. For example, the credit card recommendation system can access a database of credit card characteristics, such as an estimated APR, annual fee, cash back, and rewards. The credit card recommendation system can make further determinations, such as credit utilization or balance utilization based on the balance on the credit card and the credit card credit limit.

In some embodiments, the credit card recommendation system can identify new credit cards not currently owned by the user and provide recommendations of the new credit cards. The credit card recommendation system can assess the new credit cards based on the new card benefits, user preferences for a reward type of a credit card, and/or the estimated spend for the user. For example, the credit card recommendation system can determine an estimated new APR with possible savings based on current debt and estimated monthly spend. The credit card recommendation system can estimate balance transfer savings based on current APR paid and the APR on a new credit card. The credit card recommendation system can describe the new benefits of the card and how they are different and/or better than currently owned cards, such as via contextual codes. The credit card recommendation system can display what others like the consumers are carrying. Moreover, the credit card recommendation system can determine an expected value over a period of time, such as over a year.

Figure 7B:
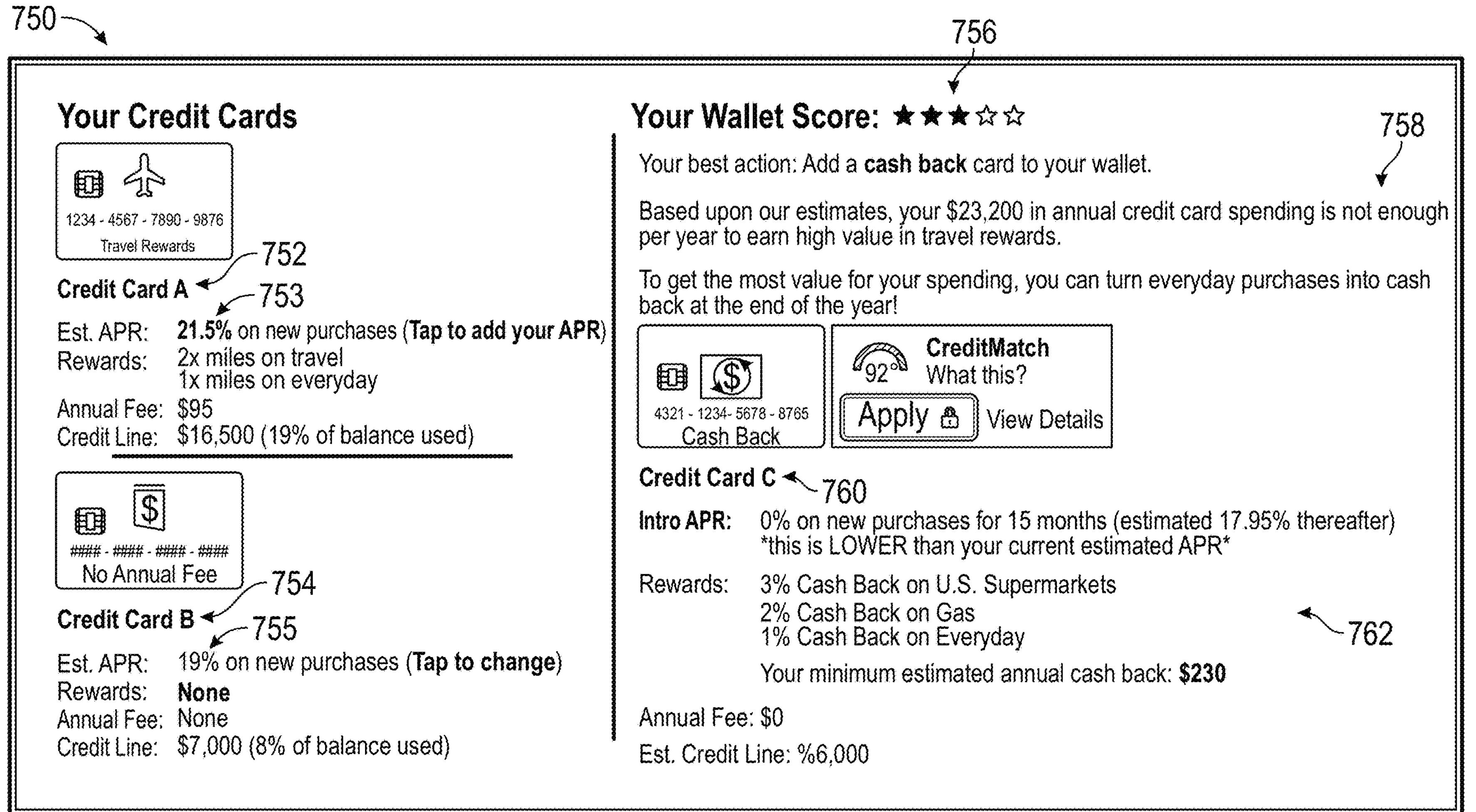
FIG. 7B illustrates a user interface for displaying existing credit cards, a wallet score, and a recommended new card, according to some embodiments.

FIG. 7B illustrates a user interface 750 for displaying existing credit cards, a wallet score, and a recommended new card, according to some embodiments. The user interface 750 illustrates existing credit cards, Credit Card A 752 with corresponding benefits 753 and Credit Card B 754 with corresponding benefits 755, a wallet score 756, a recommended new credit cards 760, an estimate savings $758, and benefits of the new credit card 762.

In some embodiments, the credit card recommendation system can display currently owned credit cards, such as credit cards 752 and 754, and display corresponding benefits 753 and 755. Thus, the user can easily compare the difference between the two. As shown, the APR for Credit Card A 752 is 21.5%, which is higher than the APR of 19% for Credit Card B 754.

In some embodiments, the credit card recommendation system can score a user's current set of cards (such as cards carried in the user's wallet). For example, the credit card recommendation system can display a wallet score 756, such as by displaying a number of stars for the credit cards currently owned. The credit card recommendation system can determine the star value based on user specific data. For example, the credit card recommendation system can explain that the $23,200 annual credit card spending is not enough to earn high value in travel rewards 758.

In some embodiments, the credit card recommendation system can recommend a better card based on user spend. Such recommendation can be based on actual spend (e.g., by analyzing transactional data of actual spend by the user) and/or an estimated spend (e.g., via user input on estimated spend per category and/or a monthly estimated spend). The credit card recommendation system can recommend Credit Card C 760 due to the cash back benefits and can display an estimated annual cash back amount. Moreover, the credit card recommendation system can display other reward characteristics of the new credit card, such as a 0% APR for the 15 months, to compare with currently owned credit cards.

Example System Implementation and Architecture

FIG. 8 is a block diagram of an example implementation of a credit card recommendation system 800 in communication with a network 860 and various systems and databases, such as lender systems 864, consumer database 866A, credit database 866B, offer details database 866C (collectively referred to herein as databases 866), and/or the like. The credit card recommendation system 800 may be used to implement systems and methods described herein.

The credit card recommendation system 800 includes, for example, a personal computer that is IBM, Macintosh, or Linux/Unix compatible or a server or workstation. In one embodiment, the credit card recommendation system 800 comprises a server, a laptop computer, a smart phone, a personal digital assistant, a kiosk, or an media player, for example. In one embodiment, the exemplary credit card recommendation system 800 includes one or more central processing unit ("CPU") 805, which may each include a conventional or proprietary microprocessor. The credit card recommendation system 800 further includes one or more memory 830, such as random access memory ("RAM") for temporary storage of information, one or more read only memory ("ROM") for permanent storage of information, and one or more mass storage device 820, such as a hard drive, diskette, solid state drive, or optical media storage device. Typically, the modules of the credit card recommendation system 800 are connected to the computer using a standard based bus system 880. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of credit card recommendation system 800 may be combined into fewer components and modules or further separated into additional components and modules.

The credit card recommendation system 800 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the credit card recommendation system 800 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary credit card recommendation system 800 may include one or more commonly available input/output (I/O) devices and interfaces 810, such as a keyboard, mouse, touchpad, and printer. In one embodiment, the I/O devices and interfaces 810 include one or more display devices, such as a monitor, that allows the visual presentation of data to a user. More particularly, a display device provides for the presentation of GUIs, application software data, and multimedia presentations, for example. The credit card recommendation system 800 may also include one or more multimedia devices 840, such as speakers, video cards, graphics accelerators, and microphones, for example.

In the embodiment of FIG. 8, the I/O devices and interfaces 810 provide a communication interface to various external devices. In the embodiment of FIG. 8, the credit card recommendation system 800 is electronically coupled to a network 860, which comprises one or more of a LAN, WAN, and/or the Internet, for example, via a wired, wireless, or combination of wired and wireless, communication link 815. The network 860 communicates with various computing devices and/or other electronic devices via wired or wireless communication links.

According to FIG. 8, in some embodiments information may be provided to the credit card recommendation system 800 over the network 860 from one or more databases 866. The databases 866 may include one or more internal and/or external data sources. In some embodiments, one or more of the databases 866 or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In the embodiment of FIG. 8, the credit card recommendation system 800 includes a best offer engine 821, a model training module 822, and a user interface module 823 that may be stored in the mass storage device 820 as executable software codes that are executed by the CPU 805. This and other modules in the credit card recommendation system 800 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 8, the credit card recommendation system 800 is configured to execute the best offer engine 821, a model training module 822, and/or a user interface module 823 to perform the various methods and/or processes described herein (such as the processes described with respect to FIGS. 1 and 2 herein).

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the credit card recommendation system 800, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:

a memory; and one or more processors configured to:

- determine, based at least in part on input from a user via interaction with one or more user interfaces, estimated spend by the user within each of a plurality of categories of goods or services, wherein the estimated spend comprises (1) a first estimated spend for a first category of goods or services and (2) a second estimated spend for a second category of goods or services;
- identify a plurality of available credit cards and associated reward data;
- generate a score for each credit card of at least a subset of the plurality of credit cards with respect to the user, wherein the score for an individual credit card of the plurality of credit cards is generated by providing a trained model with input data associated with the user, wherein the input data provided to the trained model for the individual credit card includes estimated spend for at least a subset of the plurality of categories of goods or services and reward data for the individual credit card;
- generate and cause presentation, by a user computing device, of a user interface that includes information regarding two or more of the at least a subset of the plurality of credit cards as recommended credit cards for the user based at least in part on the generated scores of the at least a subset of the plurality of credit cards;
- receive an indication of a user selection of one of the two or more presented credit cards from the user computing device; and
- cause presentation, by the user computing device, of content from a credit card server of a credit card institution associated with the selected one of the two or more presented credit cards overlaid on top of the user interface, wherein the content is displayed without redirecting the user computing device to a website of the credit card institution.

2. The system of claim 1, wherein the one or more processors are further configured to train the trained model to determine a score for a credit card when provided with input associated with an individual, wherein the trained model is trained based on historical credit data of a plurality of individuals.

3. The system of claim 1, wherein the one or more processors are further configured to receive a reward type preference of the user, wherein to identify the plurality of available credit cards is based on the reward type preference.

4. The system of claim 1, wherein the one or more processors are further configured to:

determine a reward valuation for each of the plurality of credit cards based on the estimated spend for the plurality of categories, wherein determining the reward valuation for each individual credit card of the plurality of credit cards comprises:

receiving multipliers for each of the plurality of categories, wherein the multipliers are specific to the individual credit card;

generating category point totals for each of the plurality of categories, wherein the category point totals for an individual category are based on a multiplier corresponding to the individual category and an estimated spend corresponding to the individual category for the user; and aggregating the category point totals to generate an estimated reward total for the individual credit card with respect to the user, wherein the input data provided to the trained model further includes the reward valuation.

5. The system of claim 4, wherein the one or more processors are further configured to:

normalize the aggregated category point totals for each individual credit card, wherein the normalization is based on a dollar value of a point for an individual credit card.

6. The system of claim 4, wherein the one or more processors are further configured to:

normalize the multipliers for each individual credit card, wherein the normalization is based on a dollar value of a point for an individual credit card.

7. The system of claim 1, wherein the one or more processors are further configured to:

receive user credit data, for the user, from a credit database; and determine a valuation for each of the plurality of credit cards based on the user credit data and an estimated monthly total spend across the plurality of categories, wherein the user credit data comprises a credit score and a non-zero existing balance on an existing credit card, wherein the valuation is determined by estimating an amount of interest to be accrued on a newly acquired credit card for the user based on the user credit data of the user, wherein the input data provided to the trained model further includes the valuation.

8. The system of claim 7, wherein determining the amount of interest to be accrued on the newly acquired credit card comprises:

identifying the non-zero existing balance on the existing credit card in the user credit data;

determining an estimated payoff of the non-zero existing balance on the newly acquired credit card over a period of time based on a balance transfer of the non-zero existing balance on the existing credit card to the newly acquired credit card and the estimated monthly total spend; and estimating the amount of interest to be accrued on the newly acquired credit card based on the estimated payoff of the non-zero existing balance and an Annual Percentage Rate (APR) for the newly acquired credit card.

9. The system of claim 1, wherein the reward data comprises multipliers for each of the plurality of categories.

10. A computer-implemented method comprising:

determining, based at least in part on input from a user via interaction with one or more user interfaces, estimated spend by the user within each of a plurality of categories of goods or services, wherein the estimated spend comprises (1) a first estimated spend for a first category of goods or services and (2) a second estimated spend for a second category of goods or services;

identifying a plurality of available credit cards and associated reward data;

generating a score for each credit card of at least a subset of the plurality of credit cards with respect to the user, wherein the score for an individual credit card of the plurality of credit cards is generated by providing a trained model with input data associated with the user, wherein the input data provided to the trained model for the individual credit card includes estimated spend for at least a subset of the plurality of categories of goods or services and reward data for the individual credit card;

causing presentation, by a user computing device, of a user interface that includes information regarding two or more of the at least a subset of the plurality of credit cards as recommended credit cards for the user based at least in part on the generated scores of the at least a subset of the plurality of credit cards;

receiving an indication of a user selection of one of the two or more presented credit cards from the user computing device; and causing presentation, by the user computing device, of content from a credit card server of a credit card institution associated with the selected one of the two or more presented credit cards overlaid on top of the user interface, wherein the content is displayed without redirecting the user computing device to a website of the credit card institution.

11. The computer-implemented method of claim 10, wherein identifying the plurality of credit cards is based on filtering a set of credit cards based on historical approval rates.

12. The computer-implemented method of claim 11, wherein identifying the plurality of credit cards is further based on user credit data.

13. The computer-implemented method of claim 11, wherein filtering the set of credit cards is further based on an exclusion rule specific to a third-party entity associated with the corresponding credit card.

14. The computer-implemented method of claim 10, wherein identifying the plurality of credit cards is based on identifying credit cards not currently owned by the user.

15. The computer-implemented method of claim 10 further comprising generating scores for credit cards currently owned by the user.

16. The computer-implemented method of claim 10, wherein the trained model comprises at least one of: a scorecard or a machine learning model.

17. A non-transitory computer storage medium storing computer-executable instructions that, when executed by a processor of a computing system, cause the processor to perform operations comprising:

determining, based at least in part on input from a user via interaction with one or more user interfaces, estimated spend by the user within each of a plurality of categories of goods or services, wherein the estimated spend comprises (1) a first estimated spend for a first category of goods or services and (2) a second estimated spend for a second category of goods or services;

identifying a plurality of available credit cards and associated reward data;

generating a score for each credit card of at least a subset of the plurality of credit cards with respect to the user, wherein the score for an individual credit card of the plurality of credit cards is generated by providing a trained model with input data associated with the user, wherein the input data provided to the trained model for the individual credit card includes estimated spend for at least a subset of the plurality of categories of goods or services and reward data for the individual credit card;

causing presentation, by a user computing device, of a user interface that includes information regarding two or more of the at least a subset of the plurality of credit cards as recommended credit cards for the user based at least in part on the generated scores of the at least a subset of the plurality of credit cards;

receiving an indication of a user selection of one of the two or more presented credit cards from the user computing device; and causing presentation, by the user computing device, of content from a credit card server of a credit card institution associated with the selected one of the two or more presented credit cards overlaid on top of the user interface, wherein the content is displayed without redirecting the user computing device to a website of the credit card institution.

18. The non-transitory computer storage medium of claim 17, wherein the operations further comprise: identifying credit cards among the subset of credit cards that were previously displayed to the user for redisplay of the credit card offer.

19. The non-transitory computer storage medium of claim 17, wherein the operations further comprise, prior to generating the scores, normalizing category reward points across individual credit cards of the plurality of credit cards.

* * * * *